United States Patent
Kang et al.

(10) Patent No.: US 12,516,047 B2
(45) Date of Patent: Jan. 6, 2026

(54) MELANOCORTIN-4 RECEPTOR AGONISTS

(71) Applicant: LG CHEM, LTD., Seoul (KR)

(72) Inventors: Seung Wan Kang, Seoul (KR); Hee Dong Park, Seoul (KR); Hee Dong Park, Seoul (KR); Su Jin Yeo, Seoul (KR); Hyun Seo Park, Seoul (KR); Ji Ho Hong, Seoul (KR); Hye Won Ahn, Seoul (KR); Eun Sil Choi, Seoul (KR)

(73) Assignee: LG CHEM, LTD., Seoul (KR)

( * ) Notice: Subject to any disclaimer, the term of this patent is extended or adjusted under 35 U.S.C. 154(b) by 742 days.

(21) Appl. No.: 17/619,893

(22) PCT Filed: Nov. 6, 2020

(86) PCT No.: PCT/KR2020/015462
§ 371 (c)(1),
(2) Date: Dec. 16, 2021

(87) PCT Pub. No.: WO2021/091283
PCT Pub. Date: May 14, 2021

(65) Prior Publication Data
US 2022/0289731 A1   Sep. 15, 2022

(30) Foreign Application Priority Data
Nov. 7, 2019  (KR) .......................... 10-2019-0141649

(51) Int. Cl.
*C07D 413/14* (2006.01)
*A61P 3/04* (2006.01)

(52) U.S. Cl.
CPC .............. *C07D 413/14* (2013.01); *A61P 3/04* (2018.01)

(58) Field of Classification Search
CPC ....... C07D 413/14; C07D 207/16; A61P 3/04; A61P 15/10; A61P 29/00; A61P 3/10
See application file for complete search history.

(56) References Cited

U.S. PATENT DOCUMENTS

| | | |
|---|---|---|
| 2002/0019523 A1 | 2/2002 | Palucki et al. |
| 2004/0019094 A1 | 1/2004 | Lundstedt et al. |
| 2007/0129346 A1 | 6/2007 | Lee et al. |
| 2007/0191364 A1 | 8/2007 | Braun et al. |
| 2009/0298829 A1 | 12/2009 | Choi et al. |
| 2010/0120783 A1 | 5/2010 | Lee et al. |
| 2017/0190697 A1 | 7/2017 | Yamamoto et al. |

FOREIGN PATENT DOCUMENTS

| | | |
|---|---|---|
| CL | 200500213 | 1/2006 |
| JP | 2004-529105 A | 9/2004 |
| WO | 01-70708 A1 | 9/2001 |
| WO | 2005-047251 A1 | 5/2005 |
| WO | 2006-021656 A2 | 3/2006 |
| WO | 2008-007930 A1 | 1/2008 |
| WO | 2010-056022 A2 | 5/2010 |
| WO | 2015-182723 A1 | 12/2015 |
| WO | 2022/092914 A1 | 5/2022 |
| WO | 02068388 A2 | 9/2022 |

OTHER PUBLICATIONS

Search Report issued for Chile Patent Application No. 202103409 on Nov. 14, 2023, 20 pages.
Decision to Grant a Patent issued for Japanese Patent Application No. 2021-575455 on Mar. 4, 2024, 5 pages.
International Search Report dated Feb. 23, 2021, issued in the corresponding international application No. PCT/KR2020/015462, 4 pages.

*Primary Examiner* — Clinton A Brooks
*Assistant Examiner* — Kyle Nottingham
(74) *Attorney, Agent, or Firm* — Lando & Anastasi, LLP

(57) ABSTRACT

The present invention relates to a compound exhibiting excellent agonist activity against melanocortin receptors. More specifically, the present invention relates to a compound of Formula 1, a pharmaceutical composition comprising the compound as an active ingredient, and a use thereof, and the compound of the present invention exhibits excellent agonist activity against melacortin-4 receptors and can be particularly useful in preventing or treating obesity, diabetes, inflammation and erectile dysfunction.

21 Claims, No Drawings

MELANOCORTIN-4 RECEPTOR AGONISTS

CROSS-REFERENCE TO RELATED APPLICATION(S)

This application is a 35 U.S.C. § 371 National Phase Entry Application from PCT/KR2020/015462, filed on Nov. 6, 2020 and designating the United States, which claims the benefit of priority from Korean Patent Application No. 10-2019-0141649, filed on Nov. 7, 2019 with the Korean Intellectual Property Office, all of the full disclosures of which are incorporated herein by reference.

TECHNICAL FIELD

The present invention relates to a compound exhibiting excellent agonist activity against melanocortin receptors. More specifically, the present invention relates to a compound of the following Formula 1, a pharmaceutical composition comprising the compound as an active ingredient, and a use thereof, and the compound of the present invention exhibits excellent agonist activity against melacortin-4 receptors and can be particularly useful in preventing or treating obesity, diabetes, inflammation and erectile dysfunction:

[Formula 1]

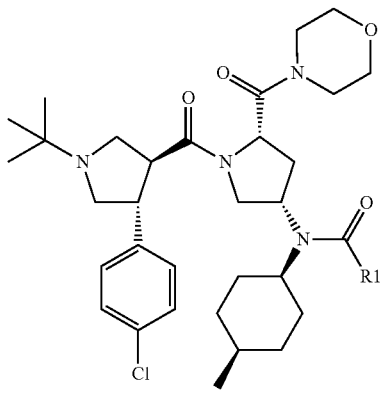

wherein R1 is $C_2$-$C_5$ alkyl.

BACKGROUND OF THE INVENTION

Leptin protein is a hormone secreted by body fat cells (adipocytes), and the amount of secretion thereof increases as the body fat content increases. The leptin protein regulates the functions of various neuropeptides produced in the hypothalamus, thereby regulating appetite, the body fat content, and various in vivo functions including energy metabolism (Schwartz, et al., Nature 404, 661-671 (2000)). The signal transduction of appetite and weight control by leptin protein is made through the regulation of many factors downstream, the most representative of which are melanocortin, agouti-related peptide (AgRP), and neuropeptide Y (NPY) hormone.

When the concentration of leptin in the blood increases as a result of excessive calorie in vivo, the secretion of proopiomelanocortin (POMC) protein hormone in the pituitary gland increases, and the production of AgRP and NPY decreases. Alpha-MSH (melanocyte stimulating hormone), which is a small peptide hormone, is produced from POMC neurons, and this hormone is an agonist of the melanocortin-4 receptor (MC4R) of secondary neurons and ultimately induces appetite reduction. On the other hand, when the concentration of leptin decreases due to calorie deficiency, the expression of AgRP—which is the MC4R antagonist— increases and the expression of NPY is also increased, this ultimately enhances the appetite. That is, depending on the changes in leptin, the alpha-MSH hormone and the AgRP hormone are involved in appetite regulation by being an agonist and antagonist for MC4R.

Alpha-MSH hormone induces various physiological responses by binding to 3 MCR subtypes in addition to MC4R. Until now, five MCR subtypes have been identified. Among the subtypes, it is known that MC1R is mainly expressed in skin cells and is involved in melanin pigmentation, MC2R is mainly expressed in the adrenal gland and is involved in the production of glucocorticoid hormone, and only ACTH (adrenocorticotropic hormone) derived from POMC is the ligand thereof. MC3R and MC4R—which are mainly expressed in the central nervous system—are involved in the regulation of appetite, energy metabolism, and fat storage efficiency in the body, and MC5R—which is expressed in various tissues—is known to regulate exocrine function (Wikberg, et al., Pharm Res 42 (5) 393-420 (2000)). Specifically, the activation of the MC4R receptor has an effect of effectively reducing body weight by inducing a decrease in appetite and an increase in energy metabolism and thus is proven to be a major point of action in the development of obesity drugs (Review: Wikberg, Eur. J. Pharmacol 375, 295-310 (1999)); Wikberg, et al., Pharm Res 42 (5) 393-420 (2000); Douglas et al., Eur J Pharm 450, 93-109 (2002); and O'Rahilly et al., Nature Med 10, 351-352 (2004)).

The role of MC4R in appetite and weight control has been primarily demonstrated through an experiment on an animal model of agouti protein abnormal expression (agouti mouse). In the case of agouti mice, it is found that the agouti protein is expressed at high concentrations in the central nervous system and acts as an antagonist of MC4R in the hypothalamus due to genetic mutations, thus inducing obesity (Yen, T T et al., FASEB J. 8, 479-488 (1994); and Lu D., et al. Nature 371, 799-802 (1994)). In subsequent research results, it is observed that AgRP (agouti-related peptide) similar to the actual agouti protein was expressed in the hypothalamic nerve, and AgRP is also known to be involved in appetite regulation as antagonists against MC4R (Shutter, et al., Genes Dev., 11, 593-602 (1997); and Oilman, et al. Science 278, 135-138 (1997)).

Cerebral administration of alpha-MSH—which is an MC4R agonist in vivo—to an animal exhibits an effect of reducing appetite, and if SHU9119 (peptide) or HS014 (peptide)—which are MC4R antagonists—are treated thereto, an effect of increasing the appetite again is observed (Kask et al., Biochem. Biophys. Res. Comm 245, 90-93 (1998)). In addition, in an animal test using Melanotan II (MTII, Ac-Nle-c[Asp-His-DPhe-Arg-Trp-Lys]-NH2) and HP228, which is an agonist similar thereto, after cerebral, intraperitoneal or subcutaneous administration, appetite suppression, weight loss, and energy metabolism increase efficacy, and the like were confirmed. (Thiele T. E., et al. Am J Physiol 274 (1 Pt 2), R248-54 (1998); Lee M. D., et al. FASEB J 12, A552 (1998); Murphy B., et al. J Appl Physiol 89, 273-82 (2000)). In contrast, when the representative SHU9119 is administered to an animal, significant and sustained feed intake and weight gain are exhibited, providing the pharmacological evidence that MCR agonists can be used to treat obesity. The appetite-reducing effect—which is evidently exhibited during the administration of MTII—is not exhibited in MC4R KO (knock-out) mice, and this experimental result again proves that the appetite-reducing effect is mainly achieved by the activation of MC4R (Marsh, et al., Nat Genet 21, 119-122 (1999)).

Appetite inhibitors that act on the central nervous system are predominant as obesity treatments developed up to date, and most of the inhibitors are drugs that modulate the action of neurotransmitters. Examples thereof include noradrenalin agents (phentermine and mazindol) and fluoxetine and sibutramine, which are serotonergic agents. However, the neurotransmitter modulator exerts a wide range of effects on various physiological actions in addition to appetite suppression by numerous subtype receptors. Therefore, the modulators lack in selectivity for each subtype and have a large disadvantage that various side effects are accompanied in case of the long-term administration.

On the other hand, melanocortins are neuropeptides, not neurotransmitters, and considering that all other functions other than energy metabolism are normal in the MC4R gene KO mice, melanocortin agonists have an advantage as an action point in that only weight loss through appetite inhibition can be induced without affecting other physiological functions. In particular, the receptor is a G-protein coupled receptor (GPCR), which belongs to the most successful category among the new drug action points developed so far, and is largely distinguished from the action points in the related art in that it is relatively easy to secure selectivity for subtype receptors.

BRIEF DESCRIPTION OF THE INVENTION

An object of the present invention is to provide a novel compound represented by Formula 1, which has excellent selective agonist activity against melanocortin receptors, specifically melanocortin-4 receptors (MC4R), or a pharmaceutically acceptable salt or isomer thereof.

Another object of the present invention is to provide a method of preparing the compound represented by Formula 1.

Still another object of the present invention is to provide a melanocortin receptor agonistic pharmaceutical composition comprising a compound represented by Formula 1, or a pharmaceutically acceptable salt or isomer thereof, as an active ingredient.

Still another object of the present invention is to provide use of the compound represented by Formula 1, or a pharmaceutically acceptable salt or isomer thereof in the prevention or treatment of obesity, diabetes, inflammation and erectile dysfunction.

Still another object of the present invention is to provide a method of preventing or treating obesity, diabetes, inflammation and erectile dysfunction, comprising administering the compound represented by Formula 1, or a pharmaceutically acceptable salt or isomer thereof to a subject in need thereof.

In order to achieve the above objects, the present invention provides a compound of the following Formula 1, or a pharmaceutically acceptable salt or isomer thereof:

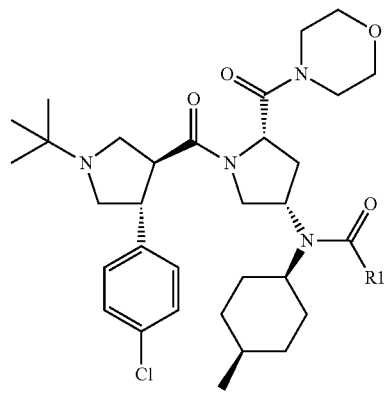

[Formula 1]

wherein R1 is $C_2$-$C_5$ alkyl.

DETAILED DESCRIPTION OF THE INVENTION

The compound of Formula 1 according to the present invention may form a pharmaceutically acceptable salt.

In addition, since the compounds according to the present invention may have an asymmetric carbon center and an asymmetric axis or an asymmetric plane, the compounds may exist as cis or trans isomers, R or S isomers, racemates, diastereomer mixtures, and individual diastereomers, and all these isomers and mixtures are included within the scope of the present invention.

In the present specification, unless indicated otherwise, the compound of Formula 1 is used in the sense of including all of the compound of Formula 1, pharmaceutically acceptable salts and isomers thereof.

In one embodiment according to the present invention, R1 in Formula 1 is $C_2$ to $C_4$ alkyl. In another embodiment according to the present invention, R1 in Formula 1 is a linear or branched $C_2$ to $C_4$ alkyl, for example, ethyl, n-propyl, isopropyl, n-butyl, isobutyl, sec-butyl, or tert-butyl.

In another embodiment according to the present invention, R1 in Formula 1 is $C_2$ or $C_3$ alkyl. In another embodiment according to the present invention, R1 in Formula 1 is linear or branched $C_2$ or $C_3$ alkyl, for example ethyl, n-propyl, or isopropyl.

In another embodiment according to the present invention, the compound of Formula 1 is N-((3S,5S)-1-((3S,4R)-1-(tert-butyl)-4-(4-chlorophenyl)pyrrolidine-3-carbonyl)-5-(morpholine-4-carbonyl)pyrrolidin-3-yl)-N-((1s,4R)-4-methylcyclohexyl)isobutyramide of the following Formula 2:

[Formula 2]

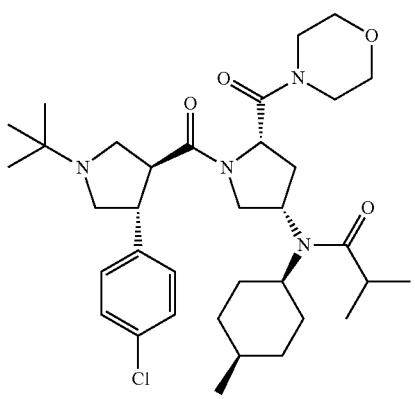

In another embodiment of the present invention, the compound of Formula 1 is N-((3S,5S)-1-((3S,4R)-1-(tert-butyl)-4-(4-chlorophenyl)pyrrolidine-3-carbonyl)-5-(morpholine-4-carbonyl)pyrrolidin-3-yl)-N-((1s,4R)-4-methylcyclohexyl)propionamide of the following Formula 3:

[Formula 3]

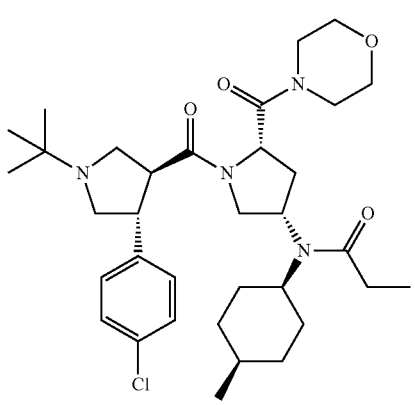

In another embodiment of the present invention, the compound of Formula 1 is N-((3S,5S)-1-((3S,4R)-1-(tert-butyl)-4-(4-chlorophenyl)pyrrolidine-3-carbonyl)-5-(morpholine-4-carbonyl)pyrrolidin-3-yl)-N-((1s,4R)-4-methylcyclohexyl)pivalamide of the following Formula 4:

[Formula 4]

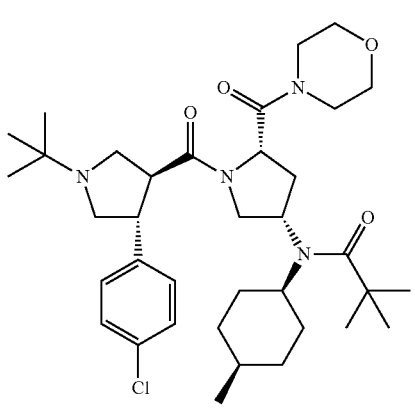

In another embodiment according to the present invention, examples of the pharmaceutically acceptable salt include acid addition salts formed by an inorganic acid such as hydrochloric acid, sulfuric acid, nitric acid, phosphoric acid, hydrobromic acid, and hydroiodic acid; an organic carboxylic acid such as tartaric acid, formic acid, citric acid, acetic acid, trichloroacetic acid, trifluoroacetic acid, gluconic acid, benzoic acid, lactic acid, fumaric acid, and maleic acid; and sulfonic acid such as methanesulfonic acid, benzenesulfonic acid, p-toluenesulfonic acid, and naphthalenesulfonic acid, but is not limited thereto.

In another embodiment of the invention, the compound is a pharmaceutical salt of the compound of Formula 1, wherein R1 is ethyl and the salt is an inorganic acid such as hydrochloric acid, sulfuric acid, nitric acid, phosphoric acid, hydrobromic acid, and hydroiodic acid; an organic carboxylic acid such as tartaric acid, formic acid, citric acid, acetic acid, trichloroacetic acid, trifluoroacetic acid, gluconic acid, benzoic acid, lactic acid, fumaric acid, and maleic acid; and sulfonic acid such as methanesulfonic acid, benzenesulfonic acid, p-toluenesulfonic acid, and naphthalenesulfonic acid.

In another embodiment of the invention, the compound is a pharmaceutical salt of the compound of Formula 1, wherein R1 is n-propyl and the salt is an inorganic acid such as hydrochloric acid, sulfuric acid, nitric acid, phosphoric acid, hydrobromic acid, and hydroiodic acid; an organic carboxylic acid such as tartaric acid, formic acid, citric acid, acetic acid, trichloroacetic acid, trifluoroacetic acid, gluconic acid, benzoic acid, lactic acid, fumaric acid, and maleic acid; and sulfonic acid such as methanesulfonic acid, benzenesulfonic acid, p-toluenesulfonic acid, and naphthalenesulfonic acid.

In another embodiment of the invention, the compound is a pharmaceutical salt of the compound of Formula 1, wherein R1 is isopropyl and the salt is an inorganic acid such as hydrochloric acid, sulfuric acid, nitric acid, phosphoric acid, hydrobromic acid, and hydroiodic acid; an organic carboxylic acid such as tartaric acid, formic acid, citric acid, acetic acid, trichloroacetic acid, trifluoroacetic acid, gluconic acid, benzoic acid, lactic acid, fumaric acid, and maleic acid; and sulfonic acid such as methanesulfonic acid, benzenesulfonic acid, p-toluenesulfonic acid, and naphthalenesulfonic acid.

In another embodiment of the invention, the compound is a pharmaceutical salt of the compound of Formula 1, wherein R1 is n-butyl and the salt is an inorganic acid such as hydrochloric acid, sulfuric acid, nitric acid, phosphoric acid, hydrobromic acid, and hydroiodic acid; an organic carboxylic acid such as tartaric acid, formic acid, citric acid, acetic acid, trichloroacetic acid, trifluoroacetic acid, gluconic acid, benzoic acid, lactic acid, fumaric acid, and maleic acid; and sulfonic acid such as methanesulfonic acid, benzenesulfonic acid, p-toluenesulfonic acid, and naphthalenesulfonic acid.

In another embodiment of the invention, the compound is a pharmaceutical salt of the compound of Formula 1, wherein R1 is isobutyl and the salt is an inorganic acid such as hydrochloric acid, sulfuric acid, nitric acid, phosphoric acid, hydrobromic acid, and hydroiodic acid; an organic carboxylic acid such as tartaric acid, formic acid, citric acid, acetic acid, trichloroacetic acid, trifluoroacetic acid, gluconic acid, benzoic acid, lactic acid, fumaric acid, and maleic acid; and sulfonic acid such as methanesulfonic acid, benzenesulfonic acid, p-toluenesulfonic acid, and naphthalenesulfonic acid.

In another embodiment of the invention, the compound is a pharmaceutical salt of the compound of Formula 1, wherein R1 is sec-butyl and the salt is an inorganic acid such as hydrochloric acid, sulfuric acid, nitric acid, phosphoric acid, hydrobromic acid, and hydroiodic acid; an organic carboxylic acid such as tartaric acid, formic acid, citric acid, acetic acid, trichloroacetic acid, trifluoroacetic acid, gluconic acid, benzoic acid, lactic acid, fumaric acid, and maleic acid; and sulfonic acid such as methanesulfonic acid, benzenesulfonic acid, p-toluenesulfonic acid, and naphthalenesulfonic acid.

In another embodiment of the invention, the compound is a pharmaceutical salt of the compound of Formula 1, wherein R1 is tert-butyl and the salt is an inorganic acid such as hydrochloric acid, sulfuric acid, nitric acid, phosphoric acid, hydrobromic acid, and hydroiodic acid; an organic carboxylic acid such as tartaric acid, formic acid, citric acid, acetic acid, trichloroacetic acid, trifluoroacetic acid, gluconic acid, benzoic acid, lactic acid, fumaric acid, and maleic acid; and sulfonic acid such as methanesulfonic acid, benzenesulfonic acid, p-toluenesulfonic acid, and naphthalenesulfonic acid.

In another embodiment according to the present invention, the pharmaceutically acceptable salt is hydrochloride.

In another embodiment according to the present invention, the compound of Formula 1 is N-((3S,5S)-1-((3S,4R)-1-(tert-butyl)-4-(4-chlorophenyl)pyrrolidine-3-carbonyl)-5-(morpholine-4-carbonyl)pyrrolidin-3-yl)-N-((1s,4R)-4-methylcyclohexyl)isobutyramide hydrochloride of the following Formula 5:

[Formula 5]

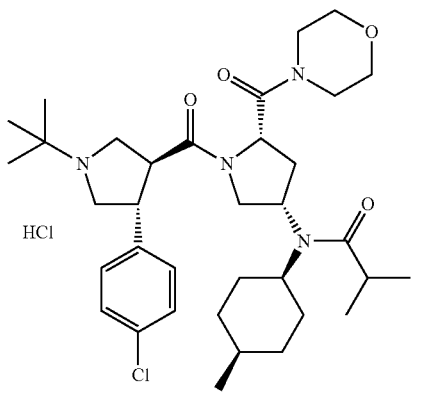

In another embodiment according to the present invention, the compound of Formula 1 is N-((3S,5S)-1-((3S,4R)-1-(tert-butyl)-4-(4-chlorophenyl)pyrrolidine-3-carbonyl)-5-(morpholine-4-carbonyl)pyrrolidin-3-yl)-N-((1s,4R)-4-methylcyclohexyl)propionamide hydrochloride of the following Formula 6:

[Formula 6]

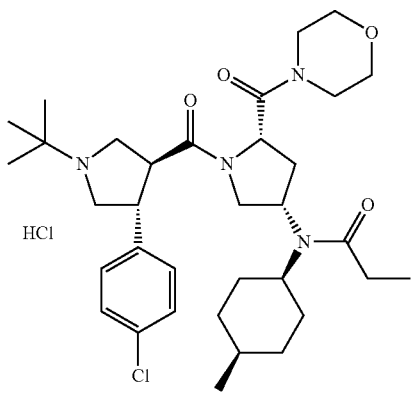

In another embodiment according to the present invention, the compound of Formula 1 is N-((3S,5S)-1-((3S,4R)-1-(tert-butyl)-4-(4-chlorophenyl)pyrrolidine-3-carbonyl)-5-(morpholine-4-carbonyl)pyrrolidin-3-yl)-N-((1s,4R)-4-methylcyclohexyl)pivalamide hydrochloride of the following Formula 7:

[Formula 7]

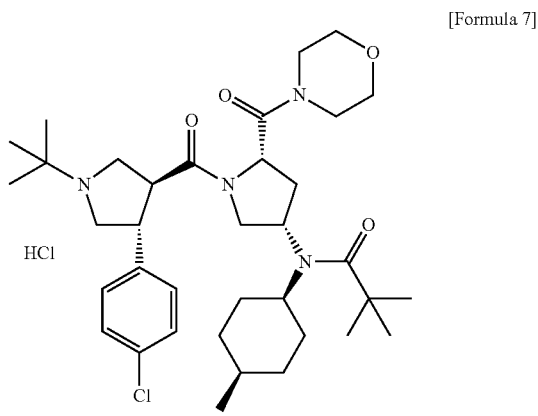 [SMILES: CC(C)(C)C(=O)N([C@H]1C[C@@H](C(=O)N2CCOCC2)N(C(=O)[C@@H]2CN(C(C)(C)C)C[C@H]2c2ccc(Cl)cc2)C1)[C@H]1CC[C@@H](C)CC1 ; Cl]

In another embodiment according to the present invention, N-((3S,5S)-1-((3S,4R)-1-(tert-butyl)-4-(4-chlorophenyl)pyrrolidine-3-carbonyl)-5-(morpholine-4-carbonyl)pyrrolidin-3-yl)-N-((1s,4R)-4-methylcyclohexyl) isobutyramide hydrochloride of the above Formula 5, N-((3S,5S)-1-((3S,4R)-1-(tert-butyl)-4-(4-chlorophenyl)pyrrolidine-3-carbonyl)-5-(morpholine-4-carbonyl)pyrrolidin-3-yl)-N-((1s,4R)-4-methylcyclohexyl)propionamide hydrochloride of the above Formula 6, and N-((3S,5S)-1-((3S,4R)-1-(tert-butyl)-4-(4-chlorophenyl)pyrrolidine-3-carbonyl)-5-(morpholine-4-carbonyl)pyrrolidin-3-yl)-N-((1s,4R)-4-methylcyclohexyl)pivalamide hydrochloride of the above Formula 7 can be prepared according to the following Reaction Scheme 1.

[Reaction Scheme 1]

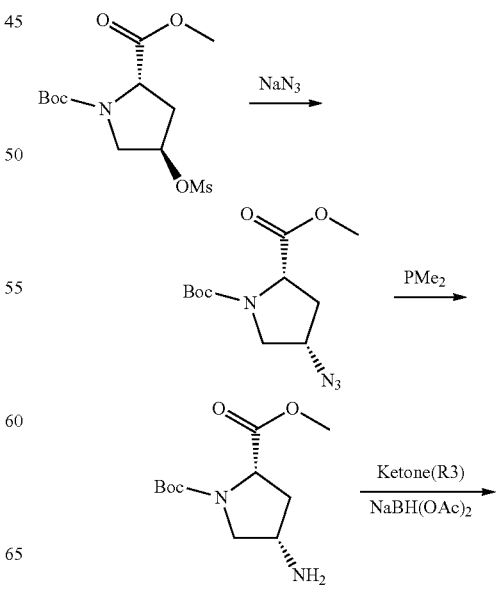

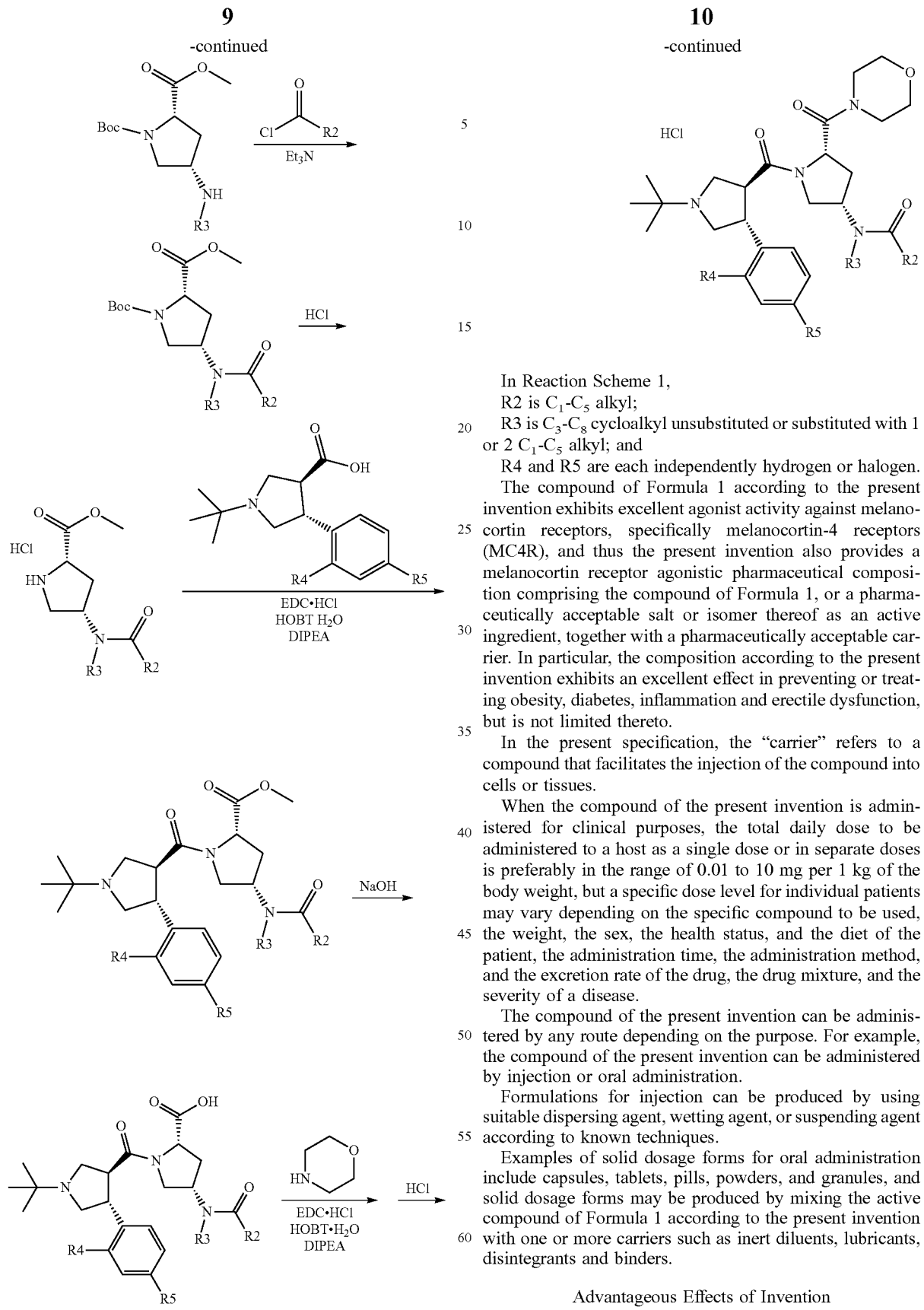

In Reaction Scheme 1,

R2 is $C_1$-$C_5$ alkyl;

R3 is $C_3$-$C_8$ cycloalkyl unsubstituted or substituted with 1 or 2 $C_1$-$C_5$ alkyl; and R4 and R5 are each independently hydrogen or halogen.

The compound of Formula 1 according to the present invention exhibits excellent agonist activity against melanocortin receptors, specifically melanocortin-4 receptors (MC4R), and thus the present invention also provides a melanocortin receptor agonistic pharmaceutical composition comprising the compound of Formula 1, or a pharmaceutically acceptable salt or isomer thereof as an active ingredient, together with a pharmaceutically acceptable carrier. In particular, the composition according to the present invention exhibits an excellent effect in preventing or treating obesity, diabetes, inflammation and erectile dysfunction, but is not limited thereto.

In the present specification, the "carrier" refers to a compound that facilitates the injection of the compound into cells or tissues.

When the compound of the present invention is administered for clinical purposes, the total daily dose to be administered to a host as a single dose or in separate doses is preferably in the range of 0.01 to 10 mg per 1 kg of the body weight, but a specific dose level for individual patients may vary depending on the specific compound to be used, the weight, the sex, the health status, and the diet of the patient, the administration time, the administration method, and the excretion rate of the drug, the drug mixture, and the severity of a disease.

The compound of the present invention can be administered by any route depending on the purpose. For example, the compound of the present invention can be administered by injection or oral administration.

Formulations for injection can be produced by using suitable dispersing agent, wetting agent, or suspending agent according to known techniques.

Examples of solid dosage forms for oral administration include capsules, tablets, pills, powders, and granules, and solid dosage forms may be produced by mixing the active compound of Formula 1 according to the present invention with one or more carriers such as inert diluents, lubricants, disintegrants and binders.

Advantageous Effects of Invention

The compound of Formula 1 according to the present invention exhibits excellent agonist activity against melanocortin receptors, particularly melanocortin-4 receptors (MC4R), and thus can be usefully used in the prevention or treatment of obesity, diabetes, inflammation, and erectile dysfunction.

The compound of Formula 1 according to the present invention exhibits an on-target effect on the melanocortin-4 receptor, does not effect anxiety and depression while exhibiting weight loss and diet reduction effects, and can be administered without side effects on human ether-α-go-go related gene (hERG) inhibition or safety problems such as mutagenesis. In addition, the compound of Formula 1 according to the present invention can be safely administered because there is no cytotoxicity and liver toxicity.

MODE FOR THE INVENTION

Hereinafter, the present invention will be described in more detail through preparation examples and examples. However, these examples are only illustrative, and the scope of the present invention is not limited thereto.

Preparation Example 1: Preparation of methyl (2S, 4S)-4-(N-((1s,4R)-4-methylcyclohexyl)isobutyramido)pyrrolidine-2-carboxylate hydrochloride

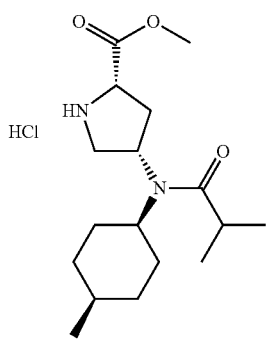 [SMILES: Cl ; COC(=O)[C@@H]1C[C@H](N(C(=O)C(C)C)[C@H]2CC[C@@H](C)CC2)CN1]

The title compound was obtained through the following steps A, B, C, D and E.

Step A: Preparation of 1-(tert-butyl) 2-methyl (2S, 4S)-4-azidopyrrolidine-1,2-dicarboxylate 1-(Tert-butyl) 2-methyl (2S,4R)-4-((methylsulfonyl)oxy) pyrrolidine-1,2-dicarboxylate (48.5 g, 150 mmol) was dissolved in N,N'-dimethylformamide (250 ml) under nitrogen, and sodium azide (19.5 g, 300 ml) was added thereto. After stirring at 80° C. for 16 hours, the reaction solvent was concentrated under reduced pressure, water was added, and extraction was performed twice with ethyl acetate. The organic layer was washed with an aqueous sodium chloride solution and water, dried over anhydrous magnesium sulfate, and filtered. The filtrate was concentrated under reduced pressure to obtain crude (39.59 g, 98%), which was used in the next step without purification.

MS [M+H]=271 (M+1)
$^1$H NMR (400 MHz, CD$_3$OD) δ 4.43-4.37 (m, 1H), 4.35-4.27 (br, 1H), 3.77 (s, 1.8H), 3.76 (s, 1.2H), 3.73-3.66 (m, 1H), 3.44-3.38 (m, 1H), 2.63-2.49 (m, 1H), 2.19-2.11 (m, 1H), 1.50 (s, 4.5H), 1.44 (s, 4.5H)

Step B: Preparation of 1-(tert-butyl) 2-methyl (2S, 4S)-4-aminopyrrolidine-1,2-dicarboxylate 1-(Tert-butyl) 2-methyl (2S,4S)-4-azidopyrrolidine-1,2-dicarboxylate (24.59 g, 91.0 mmol) obtained in Step A was dissolved in tetrahydrofuran (180 ml), and then 1M trimethylphosphine tetrahydro solution (109.2 ml, 109.2 mmol) was slowly added thereto at 0° C. After stirring at the same temperature for one hour, the mixture was stirred at room temperature for three hours. After the reaction solvent was concentrated under reduced pressure, dichloromethane (100 ml) and water (150 ml) were added and stirred for about 30 minutes. After the layers were separated and extracted once more with dichloromethane, the organic layer was dried over anhydrous magnesium sulfate and filtered. The filtrate was concentrated under reduced pressure to obtain crude (20.62 g, 93%), which was used in the next step without purification.

MS [M+H]=245 (M+1)
$^1$H NMR (400 MHz, CD$_3$OD) δ 4.27 (m, 1H), 3.77 (s, 1.8H), 3.76 (s, 1.2H), 3.75-3.67 (m, 1H), 3.50-3.42 (m, 1H), 3.22-3.17 (m, 1H), 2.58-2.47 (m, 1H), 1.82-1.71 (m, 1H), 1.48 (s, 4.5H), 1.42 (s, 4.5H)

Step C: Preparation of 1-(tert-butyl) 2-methyl (2S, 4S)-4-(((1s,4R)-4-methylcyclohexyl)amino)pyrrolidine-1,2-dicarboxylate 1-(Tert-butyl) 2-methyl (2S,4S)-4-aminopyrrolidine-1,2-dicarboxylate (20.62 g, 84.4 mmol) obtained in Step B was dissolved in dichloroethane (150 ml), and 4-methylcyclohexanone (9.5 ml, 101.3 mmol) was added thereto. Sodium triacetoxyborohydride (26.8 g, 126.6 mmol) was added at 0° C. and was stirred at room temperature for 16 hours. The reaction solvent was concentrated under reduced pressure, water was added, and extraction was performed twice with ethyl acetate. The organic layer was washed with an aqueous sodium chloride solution, dried over anhydrous magnesium sulfate, and filtered. The filtrate was concentrated under reduced pressure and purified by column chromatography to obtain the title compound (22.9 g, 80%).

MS [M+H]=341 (M+1)
$^1$H NMR (400 MHz, CD$_3$OD) δ 4.26 (m, 1H), 3.76 (s, 1.8H), 3.75 (s, 1.2H), 3.78-3.71 (m, 1H), 3.49-3.40 (m, 1H), 3.22-3.16 (m, 1H), 2.69-2.60 (br, 1H), 2.58-2.46 (m, 1H), 1.87-1.77 (m, 1H), 1.73-1.63 (m, 1H), 1.62-1.35 (m, 8H), 1.48 (s, 4.5H), 1.42 (s, 4.5H), 0.96 (d, 3H)

Step D: Preparation of 1-(tert-butyl) 2-methyl (2S, 4S)-4-(N-((1s,4R)-4-methylcyclohexyl)isobutyramido)pyrrolidine-1,2-dicarboxylate 1-(Tert-butyl) 2-methyl (2S,4S)-4-(((1s,4R)-4-methylcyclohexyl)amino)pyrrolidine-1,2-dicarboxylate (37.29 g, 109.5 mmol) obtained in Step C was dissolved in dichloromethane (500 ml), triethyl amine (61.1 ml, 438.1 mmol) was added, and isobutyryl chloride (11.7 ml, 219 mmol) was slowly added at 0° C. After stirring at room temperature for 16 hours, the reaction solvent was concentrated under reduced pressure, an aqueous sodium hydrogen carbonate solution was added, and extraction was performed twice with ethyl acetate. The organic layer was washed with an aqueous sodium chloride solution and water, dried over anhydrous magnesium sulfate, and filtered. The filtrate was concentrated under reduced pressure and purified by column chromatography to obtain the title compound (38.79 g, 86%).

MS [M+H]=411 (M+1)
$^1$H NMR (400 MHz, CD$_3$OD) δ 4.27 (m, 1H), 3.76 (s, 1.8H), 3.75 (s, 1.2H), 3.78-3.72 (m, 1H), 3.50-3.41 (m, 1H), 3.33-3.14 (m, 1H), 2.69-2.60 (m, 2H), 2.57-2.43 (m, 1H), 1.87-1.79 (m, 1H), 1.70-1.61 (m, 1H), 1.60-1.32 (m, 8H), 1.47 (s, 4.5H), 1.41 (s, 4.5H), 1.10 (dd, 6H), 0.99 (d, 3H)

Step E: Preparation of methyl (2S,4S)-4-(N-((1s,4R)-4-methylcyclohexyl)isobutyramido)pyrrolidine-2-carboxylate hydrochloride 1-(Tert-butyl) 2-methyl (2S,4S)-4-(N-((1s,4R)-4-methylcyclohexyl)isobutyramido)pyrrolidine-1,2-dicarboxylate (34.0 g, 82.8 mmol) obtained in Step D was dissolved in dichloromethane (200 ml), and a 4N hydrochloric acid 1,4-dioxane solution (82.8 ml, 331.3 mmol) was added at 0° C. After stirring at room temperature for 6 hours, the reaction solvent was concentrated under reduced pressure to obtain crude (28.7 g, 99%), which was used in the next step without purification.

MS[M+H]=311 (M+1)

Preparation Example 2: Preparation of (3S,4R)-1-(tert-butyl)-4-(4-chlorophenyl)pyrrolidine-3-carboxylic acid

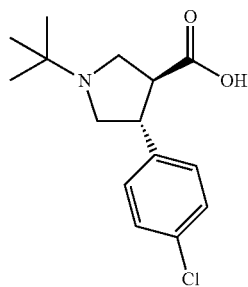 [SMILES: CC(C)(C)N1C[C@@H](C(=O)O)[C@H](c2ccc(Cl)cc2)C1]

The title compound was obtained by the method described in International Publication No. WO 2004/092126.

MS[M+H]=282 (M+1)

¹H NMR (400 MHz, CD₃OD) δ 7.43-7.33 (m, 4H), 3.90-3.69 (m, 3H), 3.59 (dd, J=11.2, 10.0 Hz, 1H), 3.29 (dd, J=11.2, 11.2 Hz, 1H), 3.18-3.09 (m, 1H), 1.44 (s, 9H)

Preparation Example 3: Preparation of methyl (2S, 4S)-4-(N-((1s,4R)-4-methylcyclohexyl)propionamido)pyrrolidine-2-carboxylate hydrochloride

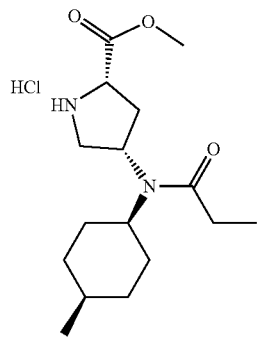 [SMILES: Cl ; CCC(=O)N([C@@H]1CN[C@H](C(=O)OC)C1)[C@H]1CC[C@@H](C)CC1]

The title compound was obtained through Steps A and B.

Step A: Preparation of 1-(tert-butyl) 2-methyl (2S, 4S)-4-(N-((1s,4R)-4-methylcyclohexyl)propionamido)pyrrolidine-1,2-dicarboxylate

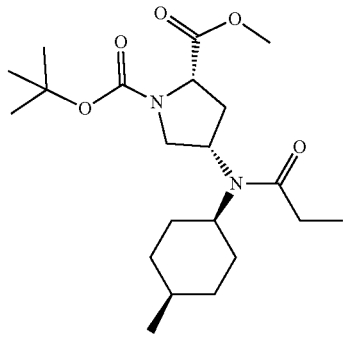 [SMILES: CCC(=O)N([C@H]1C[C@@H](C(=O)OC)N(C(=O)OC(C)(C)C)C1)[C@H]1CC[C@@H](C)CC1]

The title compound (0.98 g, 84%) was obtained in the same manner as in Step D in Preparation Example 1 by using 1-(tert-butyl) 2-methyl (2S,4S)-4-(((1s,4R)-4-methylcyclohexyl)amino)pyrrolidine-1,2-dicarboxylate (1.0 g, 2.9 mmol) obtained in Step C of Preparation Example 1 and propionyl chloride (0.33 g, 3.5 mmol).

MS [M+Na]=419.5 (M+23)

¹H NMR (400 MHz, CD₃OD) δ 4.33 (m, 1H), 4.00-3.80 (m, 2H), 3.75 (m, 3H), 3.58 (m, 1H), 3.47 (m, 1H), 2.85-2.68 (m, 1H), 2.38 (q, 2H), 2.31 (m, 1H), 1.93 (m, 1H), 1.80 (m, 2H), 1.72-1.55 (m, 4H), 1.45 (m, 2H), 1.45-1.41 (m, 9H), 1.07 (m, 6H)

Step B: Preparation of methyl (2S,4S)-4-(N-((1s, 4R)-4-methylcyclohexyl)propionamido)pyrrolidine-2-carboxylate hydrochloride

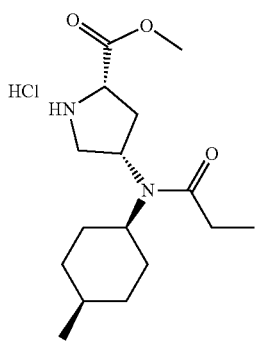 [SMILES: Cl ; CCC(=O)N([C@@H]1CN[C@H](C(=O)OC)C1)[C@H]1CC[C@@H](C)CC1]

The title compound (0.76 g, 93%) was obtained in the same manner as in Step E of Preparation Example 1 by using 1-(tert-butyl) 2-methyl (2S,4S)-4-(N-((1s,4R)-4-methylcyclohexyl)propionamido)pyrrolidine-1,2-dicarboxylate (0.98 g, 2.4 mmol) obtained in Step A.

MS [M+H]=297.4 (M+1)

¹H NMR (400 MHz, DMSO-d₆) δ 9.95 (brs, 1H), 8.63 (brs, 1H), 4.38 (m, 1H), 4.21 (m, 1H), 3.77 (s, 3H), 3.53 (m, 1H), 3.40 (m, 2H), 2.53 (m, 1H), 2.37 (q, 2H), 2.24 (m, 1H), 1.88 (m, 1H), 1.68-1.55 (m, 4H), 1.52 (m, 2H), 1.40 (m, 2H), 0.97 (m, 6H)

Preparation Example 4: Preparation of methyl (2S, 4S)-4-(N-((1s,4R)-4-methylcyclohexyl)pivalamido)pyrrolidine-2-carboxylate hydrochloride

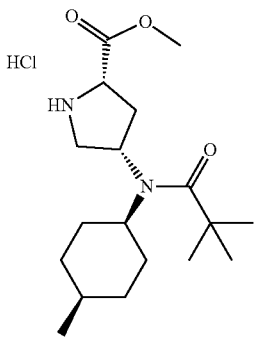 [SMILES: Cl ; COC(=O)[C@@H]1C[C@H](N(C(=O)C(C)(C)C)[C@H]2CC[C@@H](C)CC2)CN1]

The title compound was obtained through Steps A and B.

Step A: Preparation of 1-(tert-butyl) 2-methyl (2S, 4S)-4-(N-((1s,4R)-4-methylcyclohexyl)pivalamido)pyrrolidine-1,2-dicarboxylate

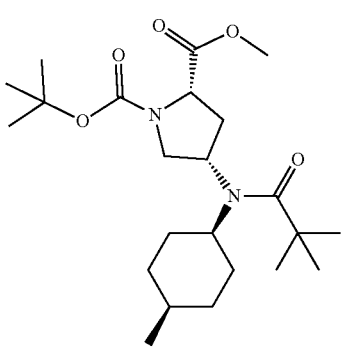 [SMILES: COC(=O)[C@@H]1C[C@H](N(C(=O)C(C)(C)C)[C@H]2CC[C@@H](C)CC2)CN1C(=O)OC(C)(C)C]

The title compound was obtained in the method disclosed in International Publication No. WO 2008/007930.

MS [M+Na]=447.5 (M+23)

$^1$H NMR (400 MHz, CD$_3$OD) δ 4.34 (m, 1H), 3.90-3.75 (m, 2H), 3.73 (m, 3H), 3.45 (m, 2H), 2.75-2.60 (m, 1H), 2.30 (m, 1H), 1.95 (m, 1H), 1.85 (m, 2H), 1.66 (m, 4H), 1.50 (m, 2H), 1.45-1.41 (m, 9H), 1.25-1.20 (m, 9H), 1.05 (d, 3H)

Step B: Preparation of methyl (2S,4S)-4-(N-((1s, 4R)-4-methylcyclohexyl)pivalamido)pyrrolidine-2-carboxylate hydrochloride

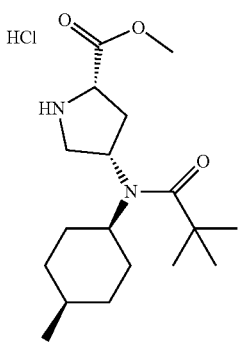 [SMILES: Cl ; COC(=O)[C@@H]1C[C@H](N(C(=O)C(C)(C)C)[C@H]2CC[C@@H](C)CC2)CN1]

The title compound (0.68 g, 99%) was obtained in the same manner as in Step E of Preparation Example 1 by using 1-(tert-butyl) 2-methyl (2S,4S)-4-(N-((1s,4R)-4-methylcyclohexyl)pivalamido)pyrrolidine-1,2-dicarboxylate (0.80 g, 1.88 mmol) obtained in Step A.

MS [M+H]=325.4 (M+1)

$^1$H NMR (400 MHz, DMSO-d$_6$) δ 10.24 (brs, 1H), 8.60 (brs, 1H), 4.41 (m, 1H), 4.22 (m, 1H), 3.77 (m, 3H), 3.40-3.28 (m, 3H), 2.55 (m, 1H), 2.20 (m, 1H), 1.87 (m, 1H), 1.70-1.50 (m, 6H), 1.40 (m, 2H), 1.21-1.10 (m, 9H), 1.00 (m, 3H)

Example 1: Preparation of N-((3S,5S)-1-((3S,4R)-1-(tert-butyl)-4-(4-chlorophenyl)pyrrolidine-3-carbonyl)-5-(morpholine-4-carbonyl)pyrrolidin-3-yl)-N-((1s,4R)-4-methylcyclohexyl)isobutyramide hydrochloride

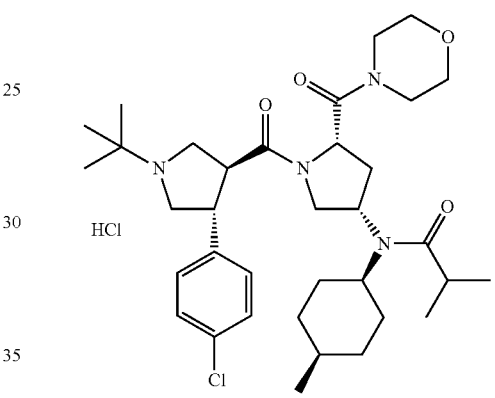

The title compound was obtained through Steps A, B, C and D.

Step A: Preparation of methyl (2S,4S)-1-((3S,4R)-1-(tert-butyl)-4-(4-chlorophenyl)pyrrolidine-3-carbonyl)-4-(N-((1s,4R)-4-methylcyclohexyl)isobutyramido)pyrrolidine-2-carboxylate Methyl (2S,4S)-4-(N-((1s,4R)-4-methylcyclohexyl)isobutyramido)pyrrolidine-2-carboxylate hydrochloride (28.7 g, 82.73 mmol) obtained in Preparation Example 1, (3S,4R)-1-(tert-butyl)-4-(4-chlorophenyl)pyrrolidine-3-carboxylic acid (24.5 g, 86.87 mmol) obtained in Preparation Example 2, 1-(3-dimethylaminopropyl)-3-ethylcarbodiimide hydrochloride (22.2 g, 115.83 mmol), and 1-hydroxybenzotriazole hydrate (15.7 g, 115.83 mmol) were dissolved in N,N'-dimethylformamide (400 ml), and N,N-diisopropylethylamine (72.0 ml, 413.66 mmol) was slowly added. After stirring at room temperature for 16 hours, the reaction solvent was concentrated under reduced pressure, then a 0.5 N aqueous sodium hydroxide solution was added, and extraction was performed twice with ethyl acetate. The organic layer was washed twice with an aqueous sodium chloride solution and water, dried over anhydrous magnesium sulfate, and filtered. The filtrate was concentrated under reduced pressure and purified by column chromatography to obtain the title compound (41.19 g, 87%).

MS [M+H]=575 (M+1)

Step B: Preparation of (2S,4S)-1-((3S,4R)-1-(tert-butyl)-4-(4-chlorophenyl)pyrrolidine-3-carbonyl)-4-(N-((1s, 4R)-4-methylcyclohexyl)isobutyramido)pyrrolidine-2-carboxylic acid Methyl (2S,4S)-1-((3S,4R)-1-(tert-butyl)-4-(4-chlorophenyl)pyrrolidine-3-carbonyl)-4-(N-((1s,4R)-4-methylcyclohexyl)isobutyramido)pyrrolidine-2-carboxylate (39.4 g, 68.62 mmol) obtained in Step A was dissolved in methanol (450 ml), and an 6N aqueous sodium hydroxide solution (57.2 ml, 343.09 mmol) was added. After stirring at room temperature for 16 hours and adjusting pH to about 5 with a 6N aqueous hydrochloric acid solution, the reaction solution was concentrated under reduced pressure. The concentrate was dissolved in dichloromethane, and then the insoluble solid was filtered with a paper filter. The filtrate was concentrated under reduced pressure to give crude (38.4 g, 99%), which was used in the next step without purification.

MS [M+H]=561 (M+1)

Step C: Preparation of N-((3S,5S)-1-((3S,4R)-1-(tert-butyl)-4-(4-chlorophenyl)pyrrolidine-3-carbonyl)-5-(morpholine-4-carbonyl)pyrrolidin-3-yl)-N-((1s,4R)-4-methylcyclohexyl)isobutyramide (2S,4S)-1-((3S,4R)-1-(tert-butyl)-4-(4-chlorophenyl)pyrrolidine-3-carbonyl)-4-(N-((1s,4R)-4-methylcyclohexyl)isobutyramido)pyrrolidine-2-carboxylic acid (38.4 g, 68.60 mmol) obtained in Step B, 1-(3-dimethylaminopropyl)-3-ethylcarbodiimide hydrochloride (18.4 g, 96.04 mmol), and 1-hydroxybenzotriazole hydrate (13.0 g, 96.04 mmol) were dissolved in N,N'-dimethylformamide (200 ml), and morpholine (5.9 ml, 68.80 mmol) and N,N'-diisopropylethylamine (59.7 ml, 343.02 mmol) were slowly and sequentially added. After stirring at room temperature for 16 hours, the reaction solution was concentrated under reduced pressure, a 0.5 N aqueous sodium hydroxide solution was added, and extraction was performed twice with ethyl acetate. The organic layer was washed twice with an aqueous sodium chloride solution and water, dried over anhydrous magnesium sulfate, and filtered. The filtrate was concentrated under reduced pressure and purified by column chromatography to obtain the title compound (37.05 g, 86%).

MS [M+H]=630 (M+1)

Step D: Preparation of N-((3S,5S)-1-((3S,4R)-1-(tert-butyl)-4-(4-chlorophenyl)pyrrolidine-3-carbonyl)-5-(morpholine-4-carbonyl)pyrrolidin-3-yl)-N-((1s,4R)-4-methylcyclohexyl)isobutyramide hydrochloride N-((3S,5S)-1-((3S,4R)-1-(tert-butyl)-4-(4-chlorophenyl)pyrrolidine-3-carbonyl)-5-(morpholine-4-carbonyl)pyrrolidin-3-yl)-N-((1s,4R)-4-methylcyclohexyl)isobutyramide (5.0 g, 7.95 mmol) obtained in Step C was dissolved in ethyl acetate (50 ml), and a 2N hydrochloric acid ethyl acetate solution (3.97 ml, 15.89 mmol) was slowly added. After stirring at room temperature for 30 minutes, the reaction solvent was concentrated under reduced pressure. The resulting crude solid was purified by trituration using hexane and diethyl ether to obtain the title compound (5.23 g, 99%).

MS [M+H]=630 (M+1)

$^1$H NMR (500 MHz, CD$_3$OD) δ 7.49-7.44 (m, 4H), 4.83 (m, 1H), 4.23-4.20 (m, 1H), 3.95-3.91 (m, 2H), 3.79-3.47 (m, 14H), 3.03-3.00 (m, 1H), 2.86-2.82 (m, 1H), 2.73-2.67 (m, 1H), 2.20-2.14 (m, 1H), 1.97 (m, 1H), 1.80-1.62 (m, 5H), 1.50 (s, 9H), 1.44-1.27 (m, 3H), 1.06-1.04 (m, 9H)

Example 2: Preparation of N-((3S,5S)-1-((3S,4R)-1-(tert-butyl)-4-(4-chlorophenyl)pyrrolidine-3-carbonyl)-5-(morpholine-4-carbonyl)pyrrolidin-3-yl)-N-((1s,4R)-4-methylcyclohexyl)propionamide hydrochloride

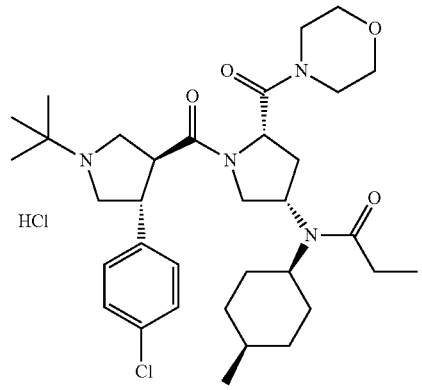 [SMILES: CCC(=O)N([C@H]1C[C@@H](C(=O)N2CCOCC2)N(C(=O)[C@@H]2CN(C(C)(C)C)C[C@H]2c2ccc(Cl)cc2)C1)[C@H]1CC[C@@H](C)CC1 ; Cl]

The title compound was obtained through Steps A, B, C and D.

Step A: Preparation of methyl (2S,4S)-1-((3S,4R)-1-(tert-butyl)-4-(4-chlorophenyl)pyrrolidine-3-carbonyl)-4-(N-((1s,4R)-4-methylcyclohexyl)propionamido)pyrrolidine-2-carboxylate

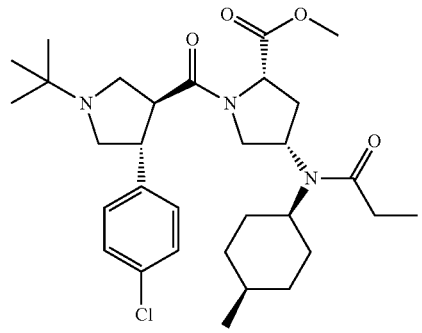 [SMILES: CCC(=O)N([C@H]1C[C@@H](C(=O)OC)N(C(=O)[C@@H]2CN(C(C)(C)C)C[C@H]2c2ccc(Cl)cc2)C1)[C@H]1CC[C@@H](C)CC1]

The title compound (0.45 g, 35%) was obtained in the same manner as in Step A of Example 1 by using methyl (2S,4S)-4-(N-((1s,4R)-4-methylcyclohexyl)propionamido)pyrrolidine-2-carboxylate hydrochloride (0.76 g, 2.28 mmol) obtained in Preparation Example 3 and (3S,4R)-1-(tert-butyl)-4-(4-chlorophenyl)pyrrolidine-3-carboxylic acid (0.64 g, 2.28 mmol) obtained in Preparation Example 2.

MS [M+H]=560.4 (M+1)

$^1$H NMR (400 MHz, CD$_3$OD) δ 7.39-7.30 (m, 4H), 4.45 (m, 1H), 4.04 (m, 1H), 3.71 (s, 3H), 3.65-3.35 (m, 6H), 3.13 (m, 2H), 2.99 (m, 1H), 2.71 (m, 1H), 2.34 (q, 2H), 2.20 (m, 1H), 1.92 (m, 1H), 1.75-1.55 (m, 6H), 1.42 (m, 2H), 1.22 (m, 9H), 1.03 (m, 6H)

Step B: Preparation of (2S,4S)-1-((3S,4R)-1-(tert-butyl)-4-(4-chlorophenyl)pyrrolidine-3-carbonyl)-4-(N-((1s,4R)-4-methylcyclohexyl)propionamido)pyrrolidine-2-carboxylic acid

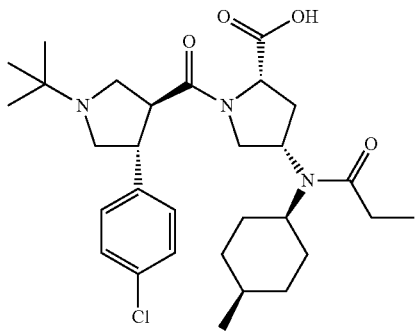 [SMILES: CCC(=O)N([C@H]1C[C@@H](C(=O)O)N(C(=O)[C@@H]2CN(C(C)(C)C)C[C@H]2c2ccc(Cl)cc2)C1)[C@H]1CC[C@@H](C)CC1]

The title compound (0.44 g, 99%) was obtained in the same manner as in Step B of Example 1 by using methyl (2S,4S)-1-((3S,4R)-1-(tert-butyl)-4-(4-chlorophenyl)pyrrolidine-3-carbonyl)-4-(N-((1s,4R)-4-methylcyclohexyl)propionamido)pyrrolidine-2-carboxylate (0.45 g, 0.80 mmol) obtained in Step A.

MS [M+H]=546.4 (M+1)

Step C: Preparation of N-((3S,5S)-1-((3S,4R)-1-(tert-butyl)-4-(4-chlorophenyl)pyrrolidine-3-carbonyl)-5-(morpholine-4-carbonyl)pyrrolidin-3-yl)-N-((1s,4R)-4-methylcyclohexyl)propionamide

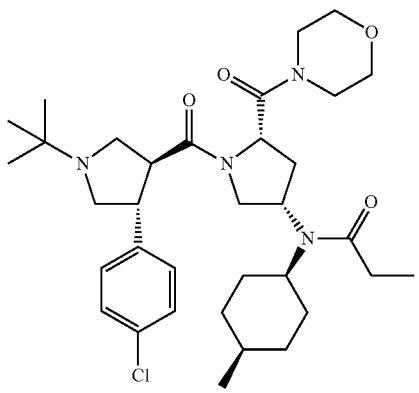 [SMILES: CCC(=O)N([C@H]1C[C@@H](C(=O)N2CCOCC2)N(C(=O)[C@@H]2CN(C(C)(C)C)C[C@H]2c2ccc(Cl)cc2)C1)[C@H]1CC[C@@H](C)CC1]

The title compound (0.28 g, 53%) was obtained in the same manner as in Step C of Example 1 by using (2S,4S)-1-((3S,4R)-1-(tert-butyl)-4-(4-chlorophenyl)pyrrolidine-3-carbonyl)-4-(N-((1s,4R)-4-methylcyclohexyl)propionamido)pyrrolidine-2-carboxylic acid (0.44 g, 0.80 mmol) obtained in Step B.

MS [M+H]=615.5 (M+1)

$^1$H NMR (400 MHz, CD$_3$OD) δ 7.36 (m, 4H), 4.79 (m, 1H), 4.18 (m, 1H), 3.80-3.40 (m, 15H), 3.20 (m, 1H), 3.03 (m, 1H), 2.70 (m, 1H), 2.33 (q, 2H), 2.15 (m, 1H), 1.93 (m, 1H), 1.71-1.56 (m, 6H), 1.40-1.20 (m, 11H), 1.00 (m, 6H)

Step D: Preparation of N-((3S,5S)-1-((3S,4R)-1-(tert-butyl)-4-(4-chlorophenyl)pyrrolidine-3-carbonyl)-5-(morpholine-4-carbonyl)pyrrolidin-3-yl)-N-((1s,4R)-4-methylcyclohexyl)propionamide hydrochloride

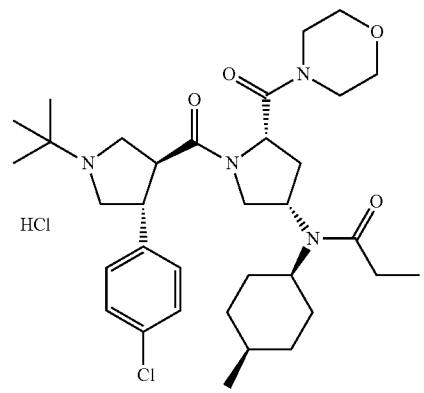 [SMILES: CCC(=O)N([C@H]1C[C@@H](C(=O)N2CCOCC2)N(C(=O)[C@@H]2CN(C(C)(C)C)C[C@H]2c2ccc(Cl)cc2)C1)[C@H]1CC[C@@H](C)CC1 ; Cl]

The title compound (0.08 g, 94%) was obtained in the same manner as in Step D of Example 1 by using N-((3S,5S)-1-((3S,4R)-1-(tert-butyl)-4-(4-chlorophenyl)pyrrolidine-3-carbonyl)-5-(morpholine-4-carbonyl)pyrrolidin-3-yl)-N-((1s,4R)-4-methylcyclohexyl)propionamide (0.08 g, 0.13 mmol) obtained in Step C.

MS [M+H]=615.5 (M+1)

$^1$H NMR (400 MHz, CD$_3$OD) δ 7.43 (m, 4H), 4.82 (t, 1H), 4.20 (m, 1H), 4.06-3.40 (m, 15H), 2.97 (m, 1H), 2.69 (m, 1H), 2.33 (m, 2H), 2.15 (m, 1H), 1.93 (m, 1H), 1.80-1.53 (m, 5H), 1.47 (s, 9H), 1.50-1.25 (m, 4H), 1.01 (m, 6H)

Example 3: Preparation of N-((3S,5S)-1-((3S,4R)-1-(tert-butyl)-4-(4-chlorophenyl)pyrrolidine-3-carbonyl)-5-(morpholine-4-carbonyl)pyrrolidin-3-yl)-N-((1s,4R)-4-methylcyclohexyl)pivalamide hydrochloride

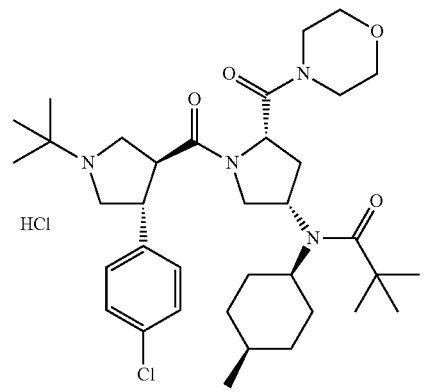 [SMILES: CC(C)(C)C(=O)N([C@H]1C[C@@H](C(=O)N2CCOCC2)N(C(=O)[C@@H]2CN(C(C)(C)C)C[C@H]2c2ccc(Cl)cc2)C1)[C@H]1CC[C@@H](C)CC1 ; Cl]

The title compound was obtained through Step A, B, C and D.

Step A: Preparation of methyl (2S,4S)-1-((3S,4R)-1-(tert-butyl)-4-(4-chlorophenyl)pyrrolidine-3-carbonyl)-4-(N-((1s,4R)-4-methylcyclohexyl)pivalamido)pyrrolidine-2-carboxylate

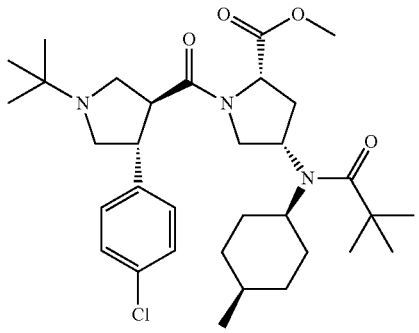 [SMILES: COC(=O)[C@@H]1C[C@H](N(C(=O)C(C)(C)C)[C@H]2CC[C@@H](C)CC2)CN1C(=O)[C@@H]1CN(C(C)(C)C)C[C@H]1c1ccc(Cl)cc1]

The title compound (0.70 g, 66%) was obtained in the same manner as in Step A of Example 1 by using methyl (2S,4S)-4-(N-((1s,4R)-4-methylcyclohexyl)pivalamido)pyrrolidine-2-carboxylate hydrochloride (0.65 g, 1.8 mmol) obtained in Preparation Example 4 and (3S,4R)-1-(tert-butyl)-4-(4-chlorophenyl)pyrrolidine-3-carboxylic acid (0.50 g, 1.8 mmol) obtained in Preparation Example 2.

MS [M+H]=588.5 (M+1)

$^1$H NMR (400 MHz, CD$_3$OD) δ 7.40-7.30 (m, 4H), 4.49 (m, 1H), 4.00-3.50 (m, 4H), 3.71 (s, 3H), 3.40 (m, 3H), 3.20-3.05 (m, 2H), 3.00 (m, 1H), 2.70 (m, 1H), 2.27 (m, 1H), 1.90 (m, 1H), 1.73-1.60 (m, 6H), 1.60-1.35 (m, 2H), 1.25-1.17 (m, 18H), 1.01 (m, 3H)

Step B: Preparation of (2S,4S)-1-((3S,4R)-1-(tert-butyl)-4-(4-chlorophenyl)pyrrolidine-3-carbonyl)-4-(N-((1s,4R)-4-methylcyclohexyl)pivalamido)pyrrolidine-2-carboxylic acid

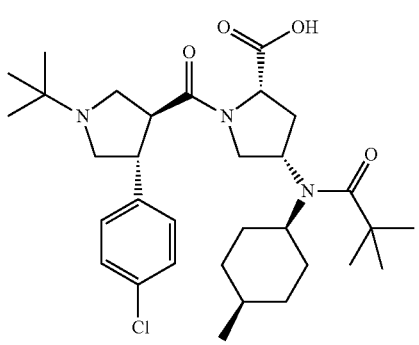 [SMILES: CC(C)(C)C(=O)N([C@H]1C[C@@H](C(=O)O)N(C(=O)[C@@H]2CN(C(C)(C)C)C[C@H]2c2ccc(Cl)cc2)C1)[C@H]1CC[C@@H](C)CC1]

The title compound (0.10 g, 99%) was obtained in the same manner as in Step B of Example 1 by using methyl (2S,4S)-1-((3S,4R)-1-(tert-butyl)-4-(4-chlorophenyl)pyrrolidine-3-carbonyl)-4-(N-((1s,4R)-4-methylcyclohexyl)pivalamido)pyrrolidine-2-carboxylate (0.10 g, 0.18 mmol) obtained in Step A.

MS [M+H]=574.4 (M+1)

Step C: Preparation of N-((3S,5S)-1-((3S,4R)-1-(tert-butyl)-4-(4-chlorophenyl)pyrrolidine-3-carbonyl)-5-(morpholine-4-carbonyl)pyrrolidin-3-yl)-N-((1s,4R)-4-methylcyclohexyl)pivalamide

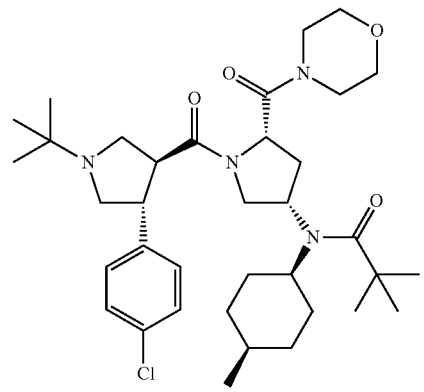 [SMILES: CC(C)(C)C(=O)N([C@H]1C[C@@H](C(=O)N2CCOCC2)N(C(=O)[C@@H]2CN(C(C)(C)C)C[C@H]2c2ccc(Cl)cc2)C1)[C@H]1CC[C@@H](C)CC1]

The title compound (0.020 g, 17%) was obtained in the same manner as in Step C of Example 1 by using (2S,4S)-1-((3S,4R)-1-(tert-butyl)-4-(4-chlorophenyl)pyrrolidine-3-carbonyl)-4-(N-((1s,4R)-4-methylcyclohexyl)pivalamido)pyrrolidine-2-carboxylic acid (0.10 g, 0.18 mmol) obtained in Step B.

MS [M+H]=643.5 (M+1)

$^1$H NMR (400 MHz, CD$_3$OD) δ 7.40-7.30 (m, 4H), 4.79 (m, 1H), 4.17 (m, 1H), 3.80-3.40 (m, 15H), 3.10 (m, 1H), 2.96 (m, 1H), 2.71 (m, 1H), 2.15 (m, 1H), 1.90 (m, 1H), 1.80-1.35 (m, 8H), 1.21-1.15 (m, 18H), 1.02 (m, 3H)

Step D: Preparation of N-((3S,5S)-1-((3S,4R)-1-(tert-butyl)-4-(4-chlorophenyl)pyrrolidine-3-carbonyl)-5-(morpholine-4-carbonyl)pyrrolidin-3-yl)-N-((1s,4R)-4-methylcyclohexyl)pivalamide hydrochloride

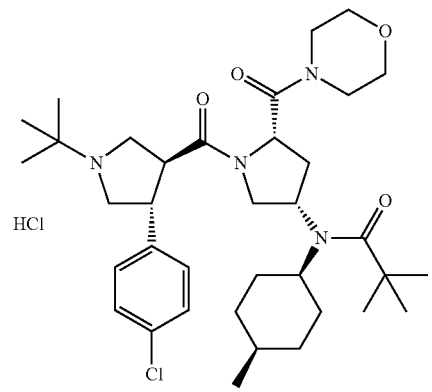 [SMILES: Cl ; CC(C)(C)C(=O)N([C@H]1C[C@@H](C(=O)N2CCOCC2)N(C(=O)[C@@H]2CN(C(C)(C)C)C[C@H]2c2ccc(Cl)cc2)C1)[C@H]1CC[C@@H](C)CC1]

The title compound (0.29 g, 83%) was obtained in the same manner as in Step D of Example 1 by using N-((3S,5S)-1-((3S,4R)-1-(tert-butyl)-4-(4-chlorophenyl)pyrrolidine-3-carbonyl)-5-(morpholine-4-carbonyl)pyrrolidin-3-yl)-N-((1s,4R)-4-methylcyclohexyl)pivalamide (0.33 g, 0.51 mmol) obtained in Step C.

MS [M+H]=643.5 (M+1)

$^1$H NMR (400 MHz, CD$_3$OD) δ 7.41 (m, 4H), 4.80 (m, 1H), 4.13 (m, 1H), 3.90 (m, 2H), 3.80-3.40 (m, 13H), 2.94 (m, 1H), 2.63 (m, 1H), 2.11 (m, 1H), 1.93 (m, 1H), 1.75 (m, 2H), 1.60 (m, 4H), 1.46 (s, 9H), 1.15 (s, 9H), 1.45-1.30 (m, 3H), 1.01 (m, 3H)

Comparative Example 1: Preparation of N-((3S, 5S)-1-((3S,4R)-1-(tert-butyl)-4-(2,4-difluorophenyl) pyrrolidine-3-carbonyl)-5-(morpholine-4-carbonyl) pyrrolidin-3-yl)-N-(4,4-dimethylcyclohexyl) acetamide hydrochloride (A95)

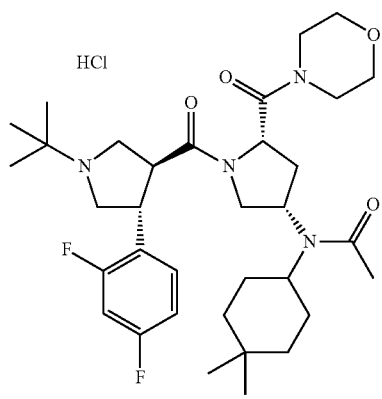 [SMILES: CC(=O)N(C1CCC(C)(C)CC1)[C@H]1C[C@@H](C(=O)N2CCOCC2)N(C(=O)[C@@H]2CN(C(C)(C)C)C[C@H]2c2ccc(F)cc2F)C1 ; Cl]

The A95 compound of International Publication No. WO 2008/007930 was obtained by the same method as disclosed therein.

Comparative Example 2: Preparation of N-((3S, 5S)-1-((3S,4R)-1-(tert-butyl)-4-(4-chlorophenyl) pyrrolidine-3-carbonyl)-5-(morpholine-4-carbonyl) pyrrolidin-3-yl)-N-(4,4-dimethylcyclohexyl) acetamide hydrochloride (A96)

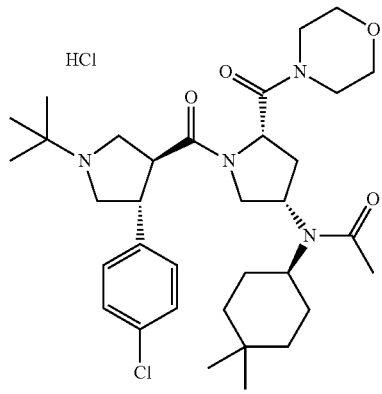

The A96 compound of International Publication No. WO 2008/007930 was obtained by the same method as disclosed therein.

Experimental Example 1: Luciferase Assay

In order to measure the agonist ability against MC4R (melanocortin-4 receptor), a cell line that permanently expresses the luciferase gene (CRE-LUC) under the control of MC4R and CRE (cAMP response element) was established. After a mammalian cell expression vector (pCDNA3 (Neo)) (Invitrogen) containing the MC4R gene was prepared, human embryonic kidney (HEK) cell lines were transformed by using Lipofectamine 2000 (Invitrogen) together with a vector (pCRE-Luc)(Stratagen) expressing a luciferase gene (CRE-LUC) under the control of a cAMP response element (CRE). Transformed cell lines (HEK MC4R-Luc) were incubated in a 37° C. incubator in the presence of 5% CO$_2$ for 24 hours by using Dulbecco's Modified Eagles Medium (DMEM) containing 10% Heat-Inactivated Fetal Bovine Serum (GIBCO/BRL). The cell lines were incubated for four days in the presence of Dulbecco's Modified Eagles Medium (DMEM) containing 10 ml of selection medium (10% Heat-Inactivated Fetal Bovine Serum (GIBCO/BRL), 100 unit/ml of penicillin (GIBCO/BRL), 100 unit/ml of streptomycin (GIBCO/BRL), 800 μg/ml of Geneticin (G418) (GIBCO/BRL). The process of removing cells killed by the selection medium by replacing the medium with 10 ml of a new selection medium was repeated three times, once every 4 days. Individual colonies formed by the finally selected and propagated clones were transferred under a microscope to a 24-well cell culture plate containing 1 ml of selection medium per well and incubated for 4 days. Forskolin (SIGMA) was treated to a final concentration of 10 μM, and then incubated for five hours in a 37° C. incubator in the presence of 5% CO$_2$. Each well was treated with 50 μl of a Bright-Glo luciferase reagent (Promega) and left at room temperature for 15 minutes, and then the luminescence of each well was measured by using a luminometer (Victor). Clones exhibiting luminescence of 100 times or more of the basic value by treatment with Forskolin were selected and used to measure the MC4R agonist ability of each compound.

HEK MC4R-Luc cells were added to each well of a 96-well luminometer cell culture plate (Costar) to a size of 2.5×10$^4$ cells in 100 μl of a culture medium and then incubated in a 37° C. incubator in the presence of 6% CO$_2$ for 18 hours. The MCR agonist diluted at each step concentration by using the above culture medium was treated so that the final DMSO concentration did not exceed 1%, and then incubated for five hours in a 37° C. incubator in the presence of 6% CO$_2$. Each well was treated with 50 μl of a Bright-Glo luciferase reagent (Promega) and left at room temperature for five minutes, and then the luminescence of each well was measured by using a luminometer (Victor). The amount of luminescence induced by the agonist diluted at each step concentration was converted into a relative % value with respect to the amount exhibited by a 10 μM NDP-α-MSH treatment. EC$_{0.5}$ MSH is expressed as a concentration that induces 50% of the maximum amount of luminescence that can be induced by NDP-α-MSH, and EC$_{50}$ is expressed as a concentration that induces 50% of the maximum amount of luminescence that can be induced by each agonist. The measurements were measured using statistical software (Prizm).

Table 1 shows the results of measuring the agonist ability of MC4R of each compound obtained by the above experiments in EC$_{50}$ (nM) units.

TABLE 1

| Luciferase assay, EC$_{50}$ (nM) | |
| --- | --- |
| Compound | MC4R |
| Example 1 | 0.562 |
| Example 2 | 1.073 |

TABLE 1-continued

| Luciferase assay, EC$_{50}$ (nM) | |
| --- | --- |
| Compound | MC4R |
| Example 3 | 0.675 |
| Comparative Example 1 (A95) | 17.45 |
| Comparative Example 2 (A96) | 5.479 |

As shown in Table 1, it was confirmed that, among the well-known melanocortin receptors in vivo, with respect to the melanocortin-4 receptor (MC4R) involved in energy metabolism and weight control in vivo, the compounds of the examples have more excellent MC4R agonist ability than the compounds of the comparative examples (A95 and A96).

Experimental Example 2: cAMP Assay

The melanocortin receptor is a type of G-protein coupled receptor (GPCR), and the main role of G-protein is to activate secondary transducers to regulate cellular responses to many physiological stimuli through signal transduction. MC4R is a Gs-coupled receptor, and it is known that if MC4R interacts with an agonist, adenylate cyclase (AC) is activated to increase the concentration of cyclic AMP (cAMP), which is one of the secondary transducers in cells. Therefore, it is possible to evaluate the activity of melanocortin receptors by measuring the generation of cAMP signals.

After cAMP Hunter Gs-coupled cell lines (CHO-K1 cell line) in which each of MC1R, MC3R, MC4R and MC5R was overexpressed were established so that the increase in the cAMP level in cells due to agonist reaction was measurable, the cells were inoculated into each well of a white cell culture plate and incubated for 24 hours in a 37° C. incubator in the presence of 5% CO$_2$. After the incubation, the medium was removed, and 15 µl of a 2:1 HBBS/10 mM HEPES:cAMP XS+Ab reagent was added. After 5 µl of the sample diluted 4 times with buffer was added, the vehicle concentration was set to 1%, and the MC4R agonist compound diluted at each step concentration was added, followed by reaction at 37° C. for 30 minutes. The activity (%) of each agonist compound is expressed as 100%×(average RLU value of sample−average RLU value of vehicle control)/(average RLU value of max control−average RLU value of vehicle control), and the value was analyzed by CBIS data analysis suite (ChemInnovation, CA).

Table 2 shows the results of measuring the agonist ability of melanocortin receptors of the compounds obtained by the above experiments in EC$_{50}$ (nM) units.

TABLE 2

| cAMP assay, EC$_{50}$ (nM) | |
| --- | --- |
| Compound | MC4R |
| Example 1 | 36.5 |
| Example 2 | 50.3 |
| Example 3 | 22.7 |
| Comparative Example 1 (A95) | 335.3 |
| Comparative Example 2 (A96) | 150.0 |

As shown in Table 2, it was confirmed that, among the well-known melanocortin receptors in vivo, with respect to the melanocortin-4 receptor (MC4R) involved in energy metabolism and weight control in vivo, the compounds of the examples have more excellent receptor agonist ability than the compounds of the comparative examples (A95 and A96).

Experimental Example 3: β-Arrestin Assay

The melanocortin receptor is a type of G-protein coupled receptor (GPCR) and regulates various physiological responses by transducing signals from many neurotransmitters. When GPCR is phosphorylated, β-arrestin is bound to the phosphorylated part of the receptor and plays an important role in activating various signaling pathways in cells through interaction with other proteins. It is known that, when the melanocortin receptor interacts with an agonist, β-arrestin is mobilized and is involved in the β-arrestin-mediated signaling pathway. Therefore, the activity of the melanocortin receptor can be evaluated through the measurement of β-arrestin.

A Pathhunter eXpress β-arrestin cell line (U2OS cell line) in which Prolink (PK)-tagged MC1R, MC3R, MC4R, MC5R and Enzyme acceptor (EA)-tagged β-arrestin were expressed together was established. When the MCR-PK portion of this cell line is activated, β-arrestin-EA is mobilized, and enzyme acceptor (EA) and Prolink (PK), which are the β-galactosidase enzyme fragments, interact. The activated enzyme hydrolyzes the substrate by β-galactosidase activity to produce a chemiluminescent signal, so that the activity can be measured. After the Pathhunter eXpress β-arrestin cell line (U2OS cell line) was incubated, the cells were inoculated into each well of the cell culture plate and incubated for 48 hours in a 37° C. incubator in the presence of 5% CO$_2$. After the incubation, 5 µl of the sample diluted 5 times with buffer was added, the vehicle concentration was set to 1%, and the MC4R agonist compound diluted at each step concentration was added, followed by reaction at 37° C. for 90 minutes. The activity (%) of each agonist compound is expressed as 100%×(average RLU value of sample−average RLU value of vehicle control)/(average maximum value of control ligand−average RLU value of vehicle control), and the value was analyzed by CBIS data analysis suite (ChemInnovation, CA).

Table 3 shows the results of measuring the activity ability of the melanocortin receptor of each compound obtained by the above experiments in EC$_{50}$ (nM) units.

TABLE 3

| β-arrestin assay, EC$_{50}$ (nM) | |
| --- | --- |
| Compound | MC4R |
| Example 1 | 4.6 |
| Example 2 | 8.7 |
| Example 3 | 3.3 |
| Comparative Example 1 (A95) | 176.4 |
| Comparative Example 2 (A96) | 44.3 |

As shown in Table 3, it was confirmed that, among the well-known melanocortin receptors in vivo, with respect to the melanocortin-4 receptor (MC4R) involved in energy metabolism and weight control in vivo, the compounds of the examples have more excellent receptor agonist ability than the compounds of the comparative examples (A95 and A96).

Experimental Example 4: Binding Affinity

Five subtypes of melanocortin receptor (MCR) in vivo are known, and it is known that MC4R, which is Subtype 4, is involved in energy metabolism and weight control. Since other MCR subtypes are involved in the regulation of various functions in vivo such as skin pigmentation, energy homeostasis, and exocrine functions, securing selectivity for MC4R of MC4R agonist compounds is very important in preventing possible side effects in the future. Therefore, the receptor binding abilities of MC4R agonists for each MCR subtype were measured.

After the CHO-K1 cell line expressing human recombinant MC1R and the HEK-293 cell lines expressing MC3R, MC4R and MC5R were established, membranes were collected from each cell line. In a 96-well cell culture plate, 3 µg MC1R membrane and 0.04 nM $^{125}$I-NDP-α-MSH per well were reacted at 37° C. for two hours. 3 µg MC3R and MC5R membrane and 0.035 nM $^{125}$I-NDP-α-MSH were reacted at 37° C. for one hour, and 3.12 µg MC4R membrane and 0.02 nM $^{125}$I-NDP-α-MSH were reacted at 37° C. for two hours. At this time, 25 mM HEPES-KOH adsorption buffer (pH 7.0) containing MCR agonist diluted at each step concentration was added to each well and reacted. The reacted solution was transferred to a filter and washed with an adsorption buffer, and then radioactivity was measured. The value excluding the non-specific binding amount in the presence of 1 µM (MC1R) and 3 µM (MC3R, MC4R, MC5R) of NDP-α-MSH from each total binding amount was used as specific binding amounts of $^{125}$I-NDP-α-MSH. The degree to which the $^{125}$I-NDP-α-MSH specific binding was inhibited by the agonist diluted at each step concentration was measured. IC50 was expressed as the concentration of each agonist that inhibited specific binding of 50% of $^{125}$I-NDP-α-MSH.

Table 4 shows the results of measuring the binding of melanocortin receptors of the compounds obtained by the above experiment in Ki (nM) units.

TABLE 4

| Binding affinity, Ki (nM) | |
|---|---|
| Compound | MC4R |
| Example 1 | 65 |
| Example 2 | 110 |
| Example 3 | 24 |
| Comparative Example 1 (A95) | 1400 |
| Comparative Example 2 (A96) | 360 |

As shown in Table 4, it was confirmed that, among the well-known melanocortin receptors in vivo, with respect to the melanocortin-4 receptor (MC4R) involved in energy metabolism and weight control in vivo, the compounds of the examples have more excellent receptor binding ability than the compounds of the comparative examples (A95 and A96).

Experimental Example 5: Pharmacokinetics and Drug Metabolism

Experimental Example 5-1: Pharmacokinetic Profile

In order to investigate the pharmacokinetics (PK) properties of the compound of Example 1 and the compounds of comparative examples, the following experiment was performed.

In order to perform the PK test for the compound of Example 1 and the compounds of the comparative examples (A95 and A96), about 7 week-old C57BL6 mice were prepared, 12 individuals were assigned per administered substance, separated into groups, and starved for oral administration. On the day of administration, a drug solution was prepared at a concentration of 1 mg/mL by using distilled water (DW) as a vehicle and was orally administered at 1 mL per kg body weight of each individual, and the final dose was 10 mg/kg. At 1, 3, 8, and 24 hours after the administration, whole blood was collected through cardiac blood collection from each of the 3 individuals in each group and then placed in a heparin tube to prevent coagulation. Thereafter, the cerebrum of each individual was collected and placed in an EP tube, the weight of the tissue was measured, and frozen storage was performed at −20° C.

On the day of analysis, DDW of 4 times the volume of tissue weight was added to each tissue tube and homogenized, and the stored plasma was thawed at room temperature. As with the plasma, 50 µL of tissue homogenate was taken and transferred to a separate tube, and then 200 µL of acetonitrile (AN), which is 4 times the sample volume in total, was added to each tube of the plasma and tissue homogenate to perform deproteinization. In this case, AN included an internal standard. To prepare a calibration curve, an AN solution (with Internal Standard) with known concentrations of 0.1, 0.5, 5, 50, and 500 ng/mL was prepared, and deproteinization was performed with a volume of 4 times as above in blank plasma of each of the plasma and the brain. Thus, the final calibration curves of 0.4 to 2,000 ng/mL for the plasma and 1, 5, 50, 500, and 5,000 ng/mL for the brain were prepared. After 0.5 µL of the supernatant obtained after deproteinization was injected into LC-MS/MS, peak areas of the compounds of the example and the comparative examples (A95 and A96) were corrected with the peak areas of IS to obtain the peak response at each sample collection point and perform the concentration conversion by a calibration curve.

The pharmacokinetic parameters ($C_{max}$, $AUC_{inf}$, $t_{1/2}$, and the like) were calculated by a noncompartmental analysis method by using WinNonlin 8.1 for the values of the blood concentration with time for each administration group.

The pharmacokinetic characteristics of each compound were compared by comparing exposure, half-life changes, and the like for each drug administration group, and the resultant values are shown in Tables 5 and 6. In addition, the result values according to the ratio of the exposure to the brain to the blood exposure are shown in Table 7.

TABLE 5

| | Plasma | | |
|---|---|---|---|
| Parameters | Example 1 | Comparative Example 1 (A95) | Comparative Example 2 (A96) |
| $C_{max}$ (ng/ml) | 232.3 | 205.0 | 337.1 |
| $AUC_{inf}$ (ng · hr/mL) | 2067.0 | 564.6 | 1654.5 |
| $t_{1/2}$ (hr) | 3.9 | 2.7 | 2.6 |

TABLE 6

| | Brain | | |
|---|---|---|---|
| Parameters | Example 1 | Comparative Example 1 (A95) | Comparative Example 2 (A96) |
| $C_{max}$ (ng/ml) | 49.1 | 20 | 27.1 |
| $AUC_{inf}$ (ng · hr/mL) | 1495.3 | 222.1 | 529.6 |
| $t_{1/2}$ (hr) | 19.0 | 6.0 | 8.0 |

TABLE 7

Brain to Plasma AUC ratio

| Parameters | Example 1 | Comparative Example 1 (A95) Mean ratio | Comparative Example 2 (A96) |
|---|---|---|---|
| Value | 0.72 | 0.39 | 0.32 |

From the above results, exposure of each compound was confirmed in the whole body and the brain in the order of the compound of Example 1, the compound of Comparative Example 2 (A96), and the compound of Comparative Example 1 (A95). The half-life of loss in the brain during the observation period is higher than the value observed in the blood, and it is assumed that this means effective persistence of a series of substances at the site of efficacy expression. In addition, it was confirmed that, when each compound was administered by the same dose, the compound of the example had the most excellent absolute exposure and persistence in the brain. In addition, it was confirmed that the ratio of the brain exposure to the blood exposure of the compound of Example 1 was also the most excellent compared to the compounds of the comparative examples (A95 and A96).

In addition to these results, when the in vitro activity of each compound and the persistence of the drug were comprehensively considered, the best efficacy was able to be expected from the compound of Example 1 in comparison with the compounds of the comparative examples, when the same dose was administered. In order to achieve the efficacy of a specific level, a lower dose can be administered, and accordingly, it is expected to minimize the side effects resulting from systemic exposure.

Experimental Example 5-2: CYP Inhibition (%)

In order to confirm drug interaction against CYP (cytochrome P450) isozyme, the following experiment was performed.

In order to measure and compare the inhibitory ability of the compound of Example 1 and the compound of Comparative Example 2 (A96), CYP1A2, 2C9, 2C19, 2D6, and 3A4 recombinant enzymes were prepared. The following Table 8 was referred for the use of a probe substrate, positive control, and isozyme and measurement conditions with respect to the measurement of the inhibitory ability of each substance.

TABLE 8

| | CYP isozyme | | | | |
|---|---|---|---|---|---|
| | 1A2 | 2C9 | 2C19 | 2D6 | 3A4 |
| Probe substrate (final concentrations) | ER 0.5 µM in 1% acetonitrile | FCA 50 µM in 1% acetonitrile | BMC 10 µM in 1% DMSO | MMC 10 µM in 1% methanol | 7BQ 25 µM in 1% acetonitrile |
| Positive control | Furafylline | Tienilic acid | Ticlopidine | Paroxetine | Troleandomycin |
| Positive final concentration (mg/mL) | 0.01 | 0.1 | 0.0014 | 0.008 | 0.1 |
| Wave length (nm): excitaion/emission | 530/590 | 409/508 | 409/460 | 409/485 | 409/530 |

The incubation was performed in a 96-well plate (Costar, 3792-black, round bottom), the buffer system used for metabolism was 50 mM potassium phosphate buffer and pH 7.4, and the final reaction volume was 250 µL. The final concentrations of the compound of Example 1, the compound of Comparative Example 2 (A96), and the positive control in the total buffer was 10 µM (2% methanol (v/v)), and each included negative control (methanol only, 2% (v/v)). The buffer spiked with experimental compound was mixed with the same volume of CYP isozyme prep solution so that the final concentration was 10 µM, followed by pre-warming for 10 minutes in a 37° C. fluorescence platereader. Each well NRS solution (NADPH Regeneration System: 0.22 mM β-NADP, 2.8 mM glucose-6-phosphate, and 0.6 units/mL of glucose-6-phosphate dehydrogenase) was added, followed by pre-incubation for 30 minutes. Thereafter, the reaction was initiated by adding the substrate to the well subjected to pre-incubation and monitored at intervals of one minute at the measurement wavelength for each substrate for 30 minutes. The measured values obtained from the positive control and the compound of Example 1 were compared with the fluorescence intensity of a negative control (no inhibition or compound) to confirm the inhibitory ability of each compound against isozyme. The inhibitory ability (%) against each isozyme when each compound was treated at 10 µM is shown in Table 9. Inhibitory activity (%) was expressed based on the following criteria: A=<50%, B=>50%.

The treatment concentration of 10 µM of the compound was very high, and it is a conservative criterion to evaluate the inhibitory ability based on such treatment concentration and select a drug with an inhibitory rate lower than 50% as a candidate. It can be considered that it is least likely that the selected candidate drug in this case inhibits CYP isozyme.

TABLE 9

| | CYP inhibition (%) at 10 µM | | | | |
|---|---|---|---|---|---|
| | CYP isozyme | | | | |
| | 1A2 | 2C9 | 2C19 | 2D6 | 3A4 |
| Example 1 | A | A | A | A | A |
| Comparative Example 2 (A96) | A | B | A | A | A |

From the above results, when treated at the same concentration, it was confirmed that the inhibitory ability of the compound of Example 1 against the main CYP isozyme was lower than or similar to that of the compound (A96) of Comparative Example 2. There is a concern that Compound (A96) of Comparative Example 2 had drug interaction due to very high inhibitory ability against CYP2C9. CYP2C9 is known to be involved in the metabolism of about 10% of all commercially available drugs and to play a major role in the loss of efficacy of drugs with a narrow therapeutic window. In addition, CYP2C9 is highly significant in both research and clinical aspects as polymorphism depending on each individual has been reported. This can also be known from the fact that CYP2C9 is presented in the list of essential isozymes of which the inhibitory effect should be checked during drug development in FDA drug-drug interaction (DDI) guidance.

Based on this, it is determined that when the compound of Example 1 is administered, the drug interaction caused by CYP inhibition is lower than that of the comparative compound (A96).

Experimental Example 6: Pharmacology

The pharmacological effect of the melanocortin-4 receptor agonist of the compound of the present invention was evaluated in the following obesity model.

Experimental Example 6-1: Mouse Obesity Model Induced by High Fat Diet

The effect of melanocortin-4 receptor agonists on obesity was evaluated by using the mouse obesity model induced with a high fat diet.

Five-week-old male C57BL/6Ntaconic mice were fed with a 60 kcal % fat diet (D12492, Research Diet.) for 15 weeks to induce obesity. The compound of Example 1, the compounds of the comparative examples (A95 and A96), and sibutramine as a positive control were prepared in distilled water and orally administered to 19-week-old mouse obesity models induced by a high-fat diet once a day from day 1 to day 16. From Day 1 to Day 16, the body weight was measured once a day, the dietary intake was measured five times a week, and drinking water intake was measured twice a week. Blood glucose and glycated hemoglobin were measured on Day 15, and all animals were sacrificed on Day 17. Blood was collected through the abdominal vena cava, and the liver and epididymal adipose tissues were removed and weighed. The collected blood was placed in a heparin tube and centrifuged to separate plasma, and then plasma biochemical analysis was performed.

Table 10 shows the difference in weight change rate to the vehicle measured on Day 12 for each dose of each compound.

TABLE 10

| Day 12 | 10 mg/kg | 30 mg/kg |
|---|---|---|
| Example 1 | −9.4%* | −15.1%** |
| Comparative Example 1 | −4.8% | −4.0% |
| Comparative Example 2 | −0.2% | −7.1% |
| Sibutramine | −6.8% | NT (not tested) |

(Difference in weight change rate to vehicle)
Significant difference of body weight between vehicle control group and compound-treated group:
*$p < 0.05$,
**$p < 0.01$ (Average ± SEM, Student's t-test, unpaired, two-tailed)

In this mouse obesity models, particularly, when only the compound of Example 1 was administered, significant weight loss was shown. When the compound of Example 1 was administered at doses of 10 mg/kg and 30 mg/kg, −9.4% and −15.1% of weight gain inhibition was caused compared with the solvent-administered vehicle control, respectively, and statistically significant weight loss effect was exhibited compared with the compounds of the comparative examples (A95 and A96).

This is caused by the superior in vitro MC4R agonist ability, superior brain absolute exposure and persistence, and excellent brain exposure ratio compared to the blood exposure of the compound of Example 1, compared with the compounds of the comparative examples, and it is considered that a significant difference can be exhibited even at low doses.

In addition, the compound of Example 1 exhibited superior results equal to or higher in terms of efficacy compared with Sibutramine (Reductil), which is an obesity treatment agent in the related art, and thus it is expected to exhibit significant drug efficacy in actual clinical application.

The invention claimed is:

1. A compound of Formula 1, or a pharmaceutically acceptable salt thereof:

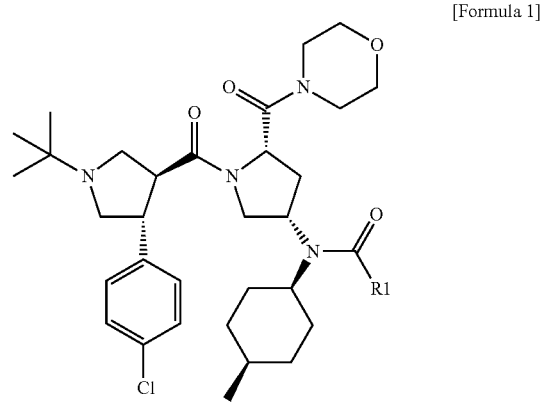

[Formula 1]

wherein R1 is ethyl, propyl, or butyl.

2. The compound, or a pharmaceutically acceptable salt thereof according to claim 1, wherein R1 is ethyl.

3. A pharmaceutical composition comprising the compound of Formula 1, or a pharmaceutically acceptable salt thereof according to claim 2 and a pharmaceutically acceptable carrier.

4. The compound, or a pharmaceutically acceptable salt thereof according to claim 1, wherein R1 is propyl.

5. A pharmaceutical composition comprising the compound of Formula 1, or a pharmaceutically acceptable salt thereof according to claim 4 and a pharmaceutically acceptable carrier.

6. The compound, or a pharmaceutically acceptable salt thereof according to claim 1, wherein R1 is butyl.

7. A pharmaceutical composition comprising the compound of Formula 1, or a pharmaceutically acceptable salt thereof according to claim 6 and a pharmaceutically acceptable carrier.

8. The compound, or a pharmaceutically acceptable salt thereof according to claim 1, wherein the compound is selected from the group consisting of:

N-((3S,5S)-1-((3S,4R)-1-(tert-butyl)-4-(4-chlorophenyl) pyrrolidine-3-carbonyl)-5-(morpholine-4-carbonyl) pyrrolidin-3-yl)-N-((1s,4R)-4-methylcyclohexyl) isobutyramide;

N-((3S,5S)-1-((3S,4R)-1-(tert-butyl)-4-(4-chlorophenyl) pyrrolidine-3-carbonyl)-5-morpholine-4-carbonyl) pyrrolidin-3-yl)-N-((1s,4R)-4-methylcyclohexyl) propionamide; and N-((3S,5S)-1-((3S,4R)-1-(tert-butyl)-4-(4-chlorophenyl)
pyrrolidine-3-carbonyl)-5-(morpholine-4-carbonyl)
pyrrolidin-3-yl)-N-((1s,4R)-4-methylcyclohexyl) piva-
lamide.

9. A pharmaceutical composition comprising the compound of Formula 1, or a pharmaceutically acceptable salt thereof according to claim 8 and a pharmaceutically acceptable carrier.

10. The compound, or a pharmaceutically acceptable salt thereof, according to claim 8, wherein the compound is:
N-((3S,5S)-1-((3S,4R)-1-(tert-butyl)-4-(4-chlorophenyl)
pyrrolidine-3-carbonyl)-5-(morpholine-4-carbonyl)
pyrrolidin-3-yl)-N-((1s,4R)-4-methylcyclohexyl)
isobutyramide.

11. The compound, or a pharmaceutically acceptable salt thereof, according to claim 8, wherein the compound is:
N-((3S,5S)-1-((3S,4R)-1-(tert-butyl)-4-(4-chlorophenyl)
pyrrolidine-3-carbonyl)-5-morpholine-4-carbonyl)
pyrrolidin-3-yl)-N-((1s,4R)-4-methylcyclohexyl) propionamide.

12. The compound, or a pharmaceutically acceptable salt thereof, according to claim 8, wherein the compound is:
N-((3S,5S)-1-((3S,4R)-1-(tert-butyl)-4-(4-chlorophenyl)
pyrrolidine-3-carbonyl)-5-(morpholine-4-carbonyl)
pyrrolidin-3-yl)-N-((1s,4R)-4-methylcyclohexyl) pivalamide.

13. The compound, or a pharmaceutically acceptable salt thereof according to claim 1, wherein the pharmaceutically acceptable salt is selected from the group consisting of the hydrochloric acid salt, sulfuric acid salt, nitric acid salt, phosphoric acid salt, hydrobromic acid salt, and hydroiodic acid salt.

14. A pharmaceutical composition comprising the compound of Formula 1, or a pharmaceutically acceptable salt thereof according to claim 13 and a pharmaceutically acceptable carrier.

15. The compound, or a pharmaceutically acceptable salt thereof according to claim 5, wherein the pharmaceutically acceptable salt is the hydrochloric acid salt.

16. A pharmaceutical composition comprising the compound of Formula 1, or a pharmaceutically acceptable salt thereof according to claim 15 and a pharmaceutically acceptable carrier.

17. A pharmaceutical composition comprising the compound of Formula 1, or a pharmaceutically acceptable salt thereof according to claim 1 and a pharmaceutically acceptable carrier.

18. A method of preventing or treating obesity in a subject in need thereof, comprising administering the pharmaceutical composition according to claim 17 to the subject.

19. A method of preventing or treating diabetes in a subject in need thereof, comprising administering the pharmaceutical composition according to claim 17 to the subject.

20. A method of preventing or treating inflammation in a subject in need thereof, comprising administering the pharmaceutical composition according to claim 17 to the subject.

21. A method of preventing or treating erectile dysfunction in a subject in need thereof, comprising administering the pharmaceutical composition according to claim 17 to the subject.

* * * * *